United States Patent
Wang et al.

(10) Patent No.: US 9,955,467 B2
(45) Date of Patent: *Apr. 24, 2018

(54) METHOD AND BS FOR TRANSMITTING CONTROL INFORMATION TO UE, AND METHOD AND UE FOR HANDLING CONTROL INFORMATION

(71) Applicant: Telefonaktiebolaget L M Ericsson (publ), Stockholm (SE)

(72) Inventors: Jun Wang, Nanjing (CN); Guidong Liu, Nanjing (CN); Yingde Liu, Nanjing (CN)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 165 days.

This patent is subject to a terminal disclaimer.

(21) Appl. No.: 14/892,335

(22) PCT Filed: Jun. 27, 2013

(86) PCT No.: PCT/CN2013/078160
§ 371 (c)(1),
(2) Date: Nov. 19, 2015

(87) PCT Pub. No.: WO2014/205736
PCT Pub. Date: Dec. 31, 2014

(65) Prior Publication Data
US 2016/0128032 A1    May 5, 2016

(51) Int. Cl.
*H04W 4/00* (2018.01)
*H04W 72/04* (2009.01)
(Continued)

(52) U.S. Cl.
CPC ......... *H04W 72/042* (2013.01); *H04L 1/0038* (2013.01); *H04L 1/1812* (2013.01);
(Continued)

(58) Field of Classification Search
None
See application file for complete search history.

(56) References Cited

U.S. PATENT DOCUMENTS

2003/0103481 A1    6/2003  Heo et al.
2010/0309870 A1   12/2010  Wengerter et al.
(Continued)

OTHER PUBLICATIONS

Author Unknown, "Technical Specification Group Radio Access Network; Evolved Universal Terrestrial Radio Access (E-UTRA); Physical Channels and Modulation (Release 8)," Technical Specification 36.211, Version 8.6.0, 3GPP Organizational Partners, Mar. 2009, 83 pages.
(Continued)

*Primary Examiner* — Bob Phunkulh
(74) *Attorney, Agent, or Firm* — Withrow & Terranova, PLLC

(57) ABSTRACT

The present disclosure relates to a method used in a BS for transmitting control information to a UE, and an associated BS. The method includes: generating a first indication indicating whether data, which are downlink data transmitted from the BS to the UE or uplink data transmitted from the UE to the BS, are in an initial transmission or a retransmission, the first indication being comprised in the control information; if the data are in the initial transmission, generating a second indication for determining modulation mode and Transport Block, TB, size of the data, the second indication being comprised in the control information; and transmitting the control information to the UE.

26 Claims, 13 Drawing Sheets

(51) Int. Cl.
*H04L 1/00* (2006.01)
*H04L 1/18* (2006.01)
*H04W 74/02* (2009.01)

(52) U.S. Cl.
CPC .......... H04L 1/1819 (2013.01); H04L 1/1861 (2013.01); *H04W 74/02* (2013.01)

(56) References Cited

U.S. PATENT DOCUMENTS

| | | | | |
|---|---|---|---|---|
| 2011/0116465 | A1* | 5/2011 | Miki | H04W 72/1215 370/329 |
| 2011/0134813 | A1* | 6/2011 | Park | H04L 1/1854 370/280 |
| 2012/0172048 | A1* | 7/2012 | Kato | H04L 5/0007 455/450 |
| 2012/0236812 | A1* | 9/2012 | Chen | H04L 1/1685 370/329 |
| 2012/0320863 | A1 | 12/2012 | Lee et al. | |
| 2012/0327783 | A1* | 12/2012 | Moon | H04L 1/1861 370/241 |
| 2013/0039292 | A1* | 2/2013 | Liu | H04L 1/1893 370/329 |
| 2013/0051269 | A1* | 2/2013 | Suzuki | H04L 1/1812 370/252 |
| 2013/0148593 | A1* | 6/2013 | Suzuki | H04L 5/0051 370/329 |
| 2013/0195041 | A1* | 8/2013 | Papasakellariou | H04W 72/042 370/329 |
| 2014/0004867 | A1* | 1/2014 | Noh | H04W 76/023 455/450 |
| 2014/0036853 | A1* | 2/2014 | Kim | H04W 16/14 370/329 |
| 2014/0036881 | A1* | 2/2014 | Kim | H04L 5/001 370/336 |
| 2014/0112289 | A1* | 4/2014 | Kim | H04W 16/14 370/329 |
| 2014/0126517 | A1* | 5/2014 | Choi | H04L 5/001 370/329 |
| 2014/0198743 | A1* | 7/2014 | Suzuki | H04W 52/146 370/329 |
| 2014/0247799 | A1* | 9/2014 | Suzuki | H04W 74/0833 370/329 |
| 2014/0307696 | A1* | 10/2014 | Choi | H04L 1/0038 370/329 |
| 2014/0328295 | A1* | 11/2014 | Ko | H04L 5/0053 370/329 |
| 2014/0328297 | A1* | 11/2014 | She | H04L 5/0091 370/329 |
| 2014/0334416 | A1* | 11/2014 | Ko | H04L 5/0053 370/329 |
| 2015/0092693 | A1* | 4/2015 | Fu | H04L 5/001 370/329 |
| 2015/0139093 | A1* | 5/2015 | Seo | H04L 5/0053 370/329 |
| 2015/0139109 | A1* | 5/2015 | Seo | H04W 72/042 370/329 |
| 2015/0146639 | A1* | 5/2015 | Seo | H04L 5/0094 370/329 |
| 2015/0181568 | A1* | 6/2015 | Seo | H04L 5/00 370/329 |
| 2015/0189546 | A1* | 7/2015 | Earnshaw | H04L 1/1858 370/329 |
| 2015/0195824 | A1* | 7/2015 | Choi | H04L 5/0053 370/236 |
| 2016/0119940 | A1* | 4/2016 | Wang | H04L 1/1861 370/329 |

OTHER PUBLICATIONS

International Preliminary Report on Patentability for International Patent Application No. PCT/CN2013/078160, dated Dec. 29, 2015, 7 pages.

Author Unknown, "Technical Specification Group Radio Access Network; Evolved Universal Terrestrial Radio Access (E-UTRA); Physical layer procedures (Release 11)," Technical Specification 36.213, Version 11.3.0, 3GPP Organizational Partners, Jun. 2013, 176 pages.

International Search Report and Written Opinion for International Patent Application No. PCT/CN2013/078160, dated Apr. 3, 2014, 12 pages.

* cited by examiner

| MRV | Modulation mode | RV |
|---|---|---|
| 0 | QPSK | 1 |
| 1 | QPSK | 2 |
| 2 | QPSK | 3 |
| 3 | 16QAM | 1 |
| 4 | 16QAM | 2 |
| 5 | 16QAM | 3 |
| 6 | 64QAM | 1 |
| 7 | 64QAM | 2 |

METHOD AND BS FOR TRANSMITTING CONTROL INFORMATION TO UE, AND METHOD AND UE FOR HANDLING CONTROL INFORMATION

This application is a 35 U.S.C. § 371 national phase filing of International Application No. PCT/CN2013/078160, filed Jun. 27, 2013, the disclosure of which is incorporated herein by reference in its entirety.

TECHNICAL FIELD

The technology presented in this disclosure generally relates to radio communication networks. More particularly, the present disclosure relates to a method used in a Base Station (BS) for transmitting control information to a User Equipment (UE) and an associated BS, and to a method used in a UE for handling control information from a BS and an associated UE.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In general, a Physical Downlink Control Channel (PDCCH) carries a message known as Downlink Control Information (DCI), which includes resource assignments and other control information for a UE or group of UEs.

There are several different message formats are available for DCI. Format 0 (also referred to as DCI0) contains fields indicating Modulation & Coding information of user plane data in Physical Uplink Shared Channel (PUSCH) from UE so that UE can do correct encoding of uplink (UL) data (the fields may be called as fields for uplink control). The other formats (including format 1, 1A, 1 B, 1C, 2, 2A, 2B, also referred to as DCI1, DCI1A, DCI1 B, DCI1C, DCI2, DCI2A, DCI2B respectively) include fields indicating Modulation & Coding information of user plane data in Physical Downlink Shared Channel (PDSCH) to UE so that UE can do correct decoding of downlink (DL) data (the fields may be called as fields for downlink control).

FIG. 1 illustrates some typical fields in DCI indicating Modulation & Coding information. As shown in FIG. 1, fields for downlink control include Modulation Coding Scheme (MCS) of five bits, Redundancy Version (RV) of two bits and New Data Indicator (NDI) of one bit. As to fields for uplink control, RV is combined with MCS, so there are six bits in total. Hereinafter, such fields will be generally referred to as a MCS layout.

FIG. 2 illustrates the existing PDSCH and PUSCH decoding procedure. As illustrated, for downlink control corresponding to PDSCH decoding, MCS is on one hand used as an input index to look up a table in the existing 3GPP 36.213 specifications to decide the real Transport Block (TB) size, and on the other hand also indicates modulation mode. There is a similar process for uplink control corresponding to PUSCH decoding.

However, the existing solutions have the following problems:

Downlink control needs 8 bits to indicate all necessary information, while uplink control only needs 6 bits. Such an asymmetric design makes uplink have to employ different processing from downlink even if most of MCS handling semantics are exactly the same.

Among the 32 values indicated by 5 bits MCS, the last three values (29, 30, and 31) are reserved to indicate the modulation mode in downlink retransmission. In other word, only 29 out of 32 values are used as the input index to decide the TB size. Such a special design not only introduces extra complexity in decoding, but also reduces valid TB size ranks from 32 to 29, thereby resulting in unnecessary accuracy loss for the TB size.

As to MCS layout for uplink control, since RV is combined with MCS into 5 bits MCS, there is no more room to indicate the modulation mode at retransmission. So, it imposes another constraint that uplink retransmission at RV1, RV2 or RV3 has to keep the same modulation mode as RV0, which limits the flexibility during uplink retransmission and may result in throughput loss.

If BS can't find the same TB size from the table of FIG. 1 during retransmission as that in initial transmission, it has to use the reserved 29, 30 or 31 at retransmission. However, here is a premise that UE must already know the initial TB size, otherwise UE will always fail to decode data regardless how many times of retransmission. Unfortunately, such a premise is NOT always true. If the initial transmission (RV0) is lost at UE unexpectedly, but BS has no idea about it, UE cannot recover from the subsequent HARQ retransmission except of RLC layer retransmission.

SUMMARY

It is in view of the above considerations and others that the various embodiments of the present technology have been made.

According to a first aspect of the present disclosure, there is proposed a method used in a BS for transmitting control information to a UE. The method includes a step of generating a first indication indicating whether data, which are downlink data transmitted from the BS to the UE or uplink data transmitted from the UE to the BS, are in an initial transmission or a retransmission. The first indication is comprised in the control information. If the data are in the initial transmission, the method further includes steps of: generating a second indication for determining modulation mode and TB size of the data, the second indication being comprised in the control information; and transmitting the control information to the UE.

Preferably, if the data are in the retransmission, the method includes steps of: generating a third indication indicating modulation mode and redundancy version for the retransmission of the data, the third indication being comprised in the control information; and transmitting the control information to the UE.

Preferably, if the data are downlink data and the downlink data are in the retransmission, the method further includes steps of: determining a first Walsh code for the UE transmitting Hybrid Automatic Repeat Request (HARQ) feedback based on a Control Channel Element (CCE) index allocated to the UE; determining a second Walsh code, which is used for the UE transmitting HARQ feedback the downlink data when the UE requests the BS to retransmit the initial transmission of the downlink data, from one or more available Walsh codes other than the first Walsh code within the same Physical Resource Block (PRB), as that of the first Walsh code; generating a fourth indication indicating the second Walsh code, the fourth indication being comprised in the control information; receiving HARQ feedback of the downlink data from the UE; and identifying that the UE requests retransmission of the initial transmission of the downlink data if the HARQ feedback uses the second Walsh code.

Preferably, if the data are uplink data and the uplink data are in the retransmission, the method further includes steps of: determining first two scrambling sequences for the UE masking HARQ feedback of previous downlink data within a bundling window based on a total number of downlink transmissions within the bundling window; determining a third scrambling sequence, which is used for the UE masking HARQ feedback of the previous downlink data when the UE requests the BS to retransmit an initial transmission of the previous downlink data, from available scrambling sequences other than the first two scrambling sequences; generating a fifth indication indicating the third scrambling sequence, the fifth indication being comprised in the control information; receiving HARQ feedback from the UE; and identifying that the UE requests retransmission of the initial transmission of the previous downlink data if the HARQ feedback is masked with the third scrambling sequence.

Preferably, the control information is transmitted via DCI. If the data are in the initial transmission, the first indication is of one bit, and the second indication is of five bits. If the data are in the retransmission, the first indication is of one bit, and the third indication is of three bits.

According to a second aspect of the present disclosure, there is proposed a method used in a UE for handling control information from a BS. The method includes steps of receiving the control information from the BS; and determining whether data, which are downlink data transmitted from the BS to the UE or uplink data transmitted from the UE to the BS, are in an initial transmission or a retransmission based on a first indication comprised in the control information. If the data are in the initial transmission, the method further includes a step of determining modulation mode and TB size of the data based on a second indication comprised in the control information.

Preferably, if the data are in the retransmission, the method further includes a step of: determining modulation mode and redundancy version for the retransmission of the data based on a third indication comprised in the control information.

Preferably, if the data are downlink data and the downlink data are in the retransmission, the method further includes steps of: determining a first Walsh code for transmitting HARQ feedback based on a CCE index allocated to the UE; determining a second Walsh code, which is used for the UE transmitting HARQ feedback of the downlink data when the UE requests the BS to retransmit the initial transmission of the downlink data, based on a fourth indication comprised in the control information, the second Walsh code being selected from one or more available Walsh codes other than the first Walsh code within the same PRB as that of the first Walsh code; and transmitting HARQ feedback of the downlink data to the BS using the second Walsh code to indicate that the UE requests retransmission of the initial transmission of the downlink data.

Preferably, if the data are uplink data and the uplink data are in the retransmission, the method further includes steps of: determining first two scrambling sequences for the UE masking Hybrid Automatic Repeat Request, HARQ, feedback of previous downlink data within a bundling window based on a total number of downlink transmissions within the bundling window; determining a third scrambling sequence, which is used for the UE masking HARQ feedback of the previous downlink data when the UE requests the BS to retransmit an initial transmission of the previous downlink data, based on a fifth indication comprised in the control information, the third scrambling sequence being selected from available scrambling sequences other than the first two scrambling sequences; and transmitting the HARQ feedback to the BS to indicate that the UE requests retransmission of the initial transmission of the previous downlink data if the HARQ feedback is masked with the third scrambling sequence.

Preferably, the control information is received via DCI. If the data are in the initial transmission, the first indication is of one bit, and the second indication is of five bits. If the data are in the retransmission, the first indication is of one bit, and the third indication is of three bits.

According to a third aspect of the present disclosure, there is proposed a method used in a BS for identifying that a UE requests the BS to retransmit an initial transmission of downlink data. The method includes steps of: determining a first position, which is used for the UE transmitting Hybrid Automatic Repeat Request, HARQ, feedback when the UE does not request the BS to retransmit the initial transmission of the downlink data; determining a second position, which is used for the UE transmitting HARQ feedback of the downlink data when the UE requests the BS to retransmit the initial transmission of the downlink data, the second position being different from the first position; transmitting to the UE an indication indicating the second position; receiving HARQ feedback of the downlink data from the UE; and identifying that the UE requests retransmission of the initial transmission of the downlink data if the HARQ feedback uses the second position.

Preferably, when the HARQ feedback is transmitted on PUCCH, the first position is indicated by a first Walsh code, which is determined based on a CCE index allocated to the UE, and the second position is indicated by a second Walsh code, which is determined from one or more available Walsh codes other than the first Walsh code within the same PRB as that of the first Walsh code.

Preferably, when the HARQ feedback is transmitted on PUSCH, the first position is indicated by first two scrambling sequences, which are determined based on a total number of downlink transmissions within a bundling window, and the second position is indicated by a third scrambling sequence, which is determined from available scrambling sequences other than the first two scrambling sequences.

According to a fourth aspect of the present disclosure, there is proposed a method used in UE for requesting a BS to retransmit an initial transmission of downlink data. The method includes steps of: determining a first position, which is used for the UE transmitting Hybrid Automatic Repeat Request, HARQ, feedback when the UE does not request the BS to retransmit the initial transmission of the downlink data; receiving from the BS an indication indicating a second position, which is used for the UE transmitting HARQ feedback of the downlink data when the UE requests the BS to retransmit the initial transmission of the downlink data, the second position being different from the first position; and transmitting HARQ feedback of the downlink data to the BS using the second position to indicate that the UE requests retransmission of the initial transmission of the downlink data.

According to a fifth aspect of the present disclosure, there is proposed a BS for transmitting control information to a UE. The BS includes a generating unit and a transmitting unit. The generating unit is configured to generate a first indication indicating whether data, which are downlink data transmitted from the BS to the UE or uplink data transmitted from the UE to the BS, are in an initial transmission or a retransmission. The first indication is included in the control information. If the data are in the initial transmission, the generating unit is further configured to generate a second indication for determining modulation mode and TB size of the data. The second indication is included in the control information. The transmitting unit is configured to transmit the control information to the UE.

According to a sixth aspect of the present disclosure, there is proposed a UE for handling control information from a BS. The UE includes a receiving unit and a determining unit. The receiving unit is configured to receive the control information from the BS. The determining unit is configured to determine whether data, which are downlink data transmitted from the BS to the UE or uplink data transmitted from the UE to the BS, are in an initial transmission or a retransmission based on a first indication comprised in the control information. If the data are in the initial transmission, the determining unit is further configured to determine modulation mode and TB size of the data based on a second indication comprised in the control information.

According to some embodiment of the present disclosure, the first indication is introduced to distinguish the initial transmission from the retransmission. In this manner, the BS may adopt fewer bits in DCI to communicate the Modulation & Coding information for both of uplink and downlink symmetrically while providing more accurate granularity for TB size. Moreover, some embodiment of the present disclosure provides an efficient feedback mechanism for the UE to request the BS to retransmit the initial transmission (i.e., RV0) again by changing HARQ feedback position without introducing other extra resource consumption.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF EMBODIMENTS

Figure 1:
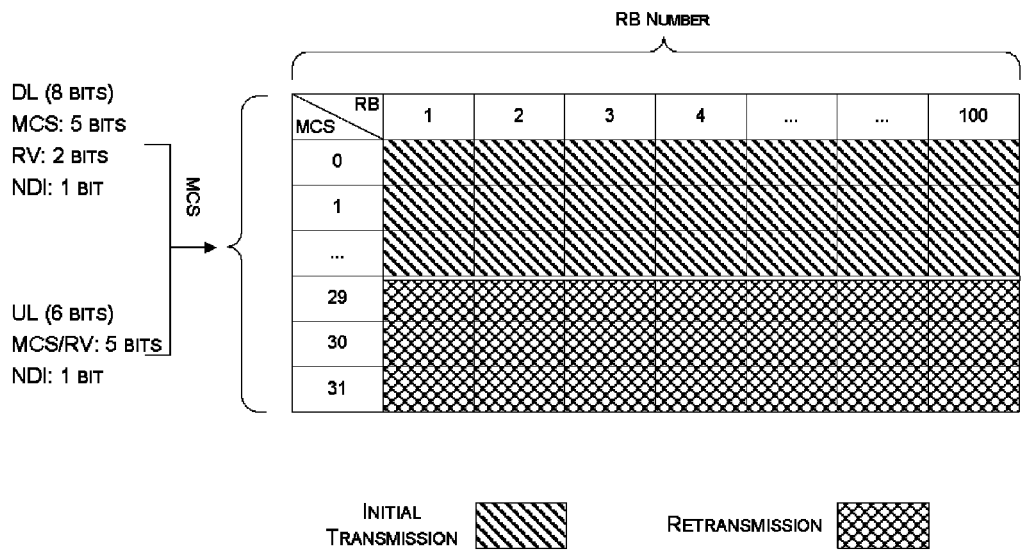
FIG. 1 illustrates some typical fields in DCI indicating Modulation & Coding information.
Figure 2:
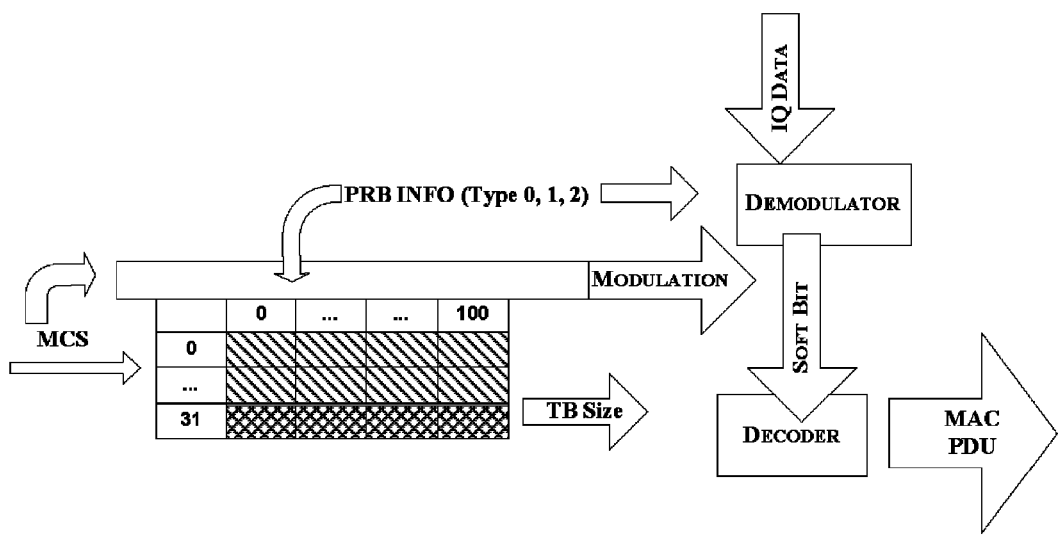
FIG. 2 illustrates the existing PDSCH and PUSCH decoding procedure.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the figures, can be arranged, substituted, combined, and designed in a wide variety of different configurations, all of which are explicitly contemplated and make part of this disclosure.

As used hereinafter, it should be appreciated the term UE may be referred to as a mobile terminal, a terminal, a user terminal (UT), a wireless terminal, a wireless communication device, a wireless transmit/receive unit (WTRU), a mobile phone, a cell phone, a PDA, a portal computer etc. Yet further, the term UE includes MTC (Machine Type Communication) devices, which do not necessarily involve human interaction. Also, the term "BS" as used herein may be referred to as a radio base station, a NodeB or an evolved NodeB (eNB), access point, relay node, etcetera.

Typically, retransmission substantially needs a different MCS layout from initial transmission. So, the present disclosure restructures the layout of FIG. 1 as following.

Figures 3, 4:
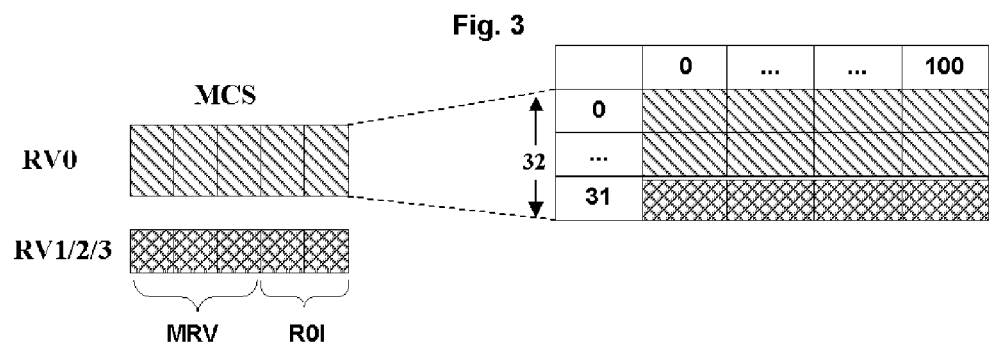
FIG. 3 illustrates different MCS layouts for initial transmission and retransmission according to the present disclosure.
FIG. 4 illustrates mapping relationships between 3 bits-MRV and corresponding modulation modes and RVs.

FIG. 3 illustrates different MCS layouts for initial transmission and retransmission according to the present disclosure.

As shown in FIG. 3, for the initial transmission (also referred to as RV0), MCS may occupy 5 bits and may be used to indicate respective indices of the existing TB size table in 3GPP 36.213 standard, so that the TB size can be extended to 32 ranks instead of 29 ranks as shown in FIG. 1, thereby bringing more accurate granularity of TB size indication to UE.

From MCS, UE may decide PDSCH/PUSCH TB size for RV0. As long as UE has known the original TB size, BS can increment the RV version and start HARQ retransmission for the NACK feedback.

For the retransmission (e.g., RV1, RV2, or RV3), the 5 bits as shown in FIG. 3 are split into two parts:
- Modulation & Redundancy Version (MRV), 3 bits, which is used to indicate the Modulation mode and RV;
- Recovery RV0 indicator (R0I), 2 bits, which is used for special handling to recover from the failure of missing original TB size.

In order to distinguish MCS layouts for initial transmission and retransmission, the present disclosure further introduces an Initial Transmission Indicator (ITI) (not shown in FIG. 3).

Hereinafter, associated indicators, including ITI, MRV and R0I, will be described in detail.

ITI

According to the present disclosure, one more bit may be introduced to indicate initial transmission or retransmission. That is, BS may use ITI to distinguish a MCS layout for initial transmission from that for retransmission. Based on ITI, UE can choose a correct MCS layout to interpret TB size, modulation mode as well as RV version.

For example, if ITI is 1, the illustrated 5 bits may be interpreted as the input index for TB size table lookup; and if ITI is 0, the 5 bits MCS should be split into 3 bits MRV and 2 bits R01.

The following table shows all combination cases of NDI and ITI:

TABLE 1

Mapping relationship between NDI and ITI

| NDI | ITI | Case |
| --- | --- | --- |
| untoggle | 0 | RV1/2/3 retransmission on existing TB |
| untoggle | 1 | RV 0 initial transmission on existing TB |
| toggle | 0 | RV1/2/3 retransmission on new TB |
| toggle | 1 | RV 0 initial transmission on new TB |

MRV

According to the present disclosure, MRV may be represented using 3 bits of MCS as shown in FIG. 3.

As mentioned above, MRV refers to Modulation and RV version. There are three modulations modes (QPSK, 16QAM, and 64QAM) and three retransmission RV versions (RV1, RV2, and RV3), it totally needs 4 bits to represent the total 3*3=9 possible MRVs. However, considering the low probability for using 64QAM in the consecutive 3 retransmissions (64QAM is usually used in the relatively good air condition, and it doesn't need to be retransmitted 3 times in most cases), MAR indicating the combination of 64QAM and RV 3 may be excluded from the total 9 possible MRVs. In this case, only 3 bits are needed to represent MRV combined encoding in MCS field. Mapping relationships between 3 bits-MRV and corresponding modulation modes and RVs are illustrated in FIG. 4.

Even if the rare case (64QAM in consecutive 3 times of retransmission) really occurs, the HARQ retransmission still can work as the RV3 will be blindly detected along with RV2 or RV 2 will be used twice in retransmission.

R0I

As mentioned above, if UE loses RV0 and no same TB size can be found at retransmission, UE will always fail to decode regardless of how many times of retransmissions due to unawareness of the real TB size.

To address such an issue, besides the existing HARQ feedbacks such as ACK, NACK and DTX, which can only indicate the latest RV version status but cannot be used to request BS to retransmit the previous RV, the present disclosure introduces R0I for UE requesting BS to retransmit RV0 again. That is, R0I is a new HARQ feedback indicator.

As HARQ feedback may be replied to BS through PUCCH or PUSCH, so R0I can be interpreted in two different manners accordingly:
1. Transmitting HARQ feedback on PUCCH, where R0I indicates a second Walsh code, which may be used by UE for transmitting HARQ feedback, other than a first Walsh code for UE transmitting HARQ feedback determined based on CCE index allocated to UE;
2. Transmitting HARQ feedback on PUSCH, where R0I indicates a third scrambling sequence, which may be used by UE for masking HARQ feedback of previous downlink data, other than first two initial scrambling sequences determined based on a total number of downlink transmissions within the bundling window.

Hereunder, some embodiments of the present disclosure will be described by employing a part of the MCS layouts as mentioned above.

First Embodiment

Figure 5:
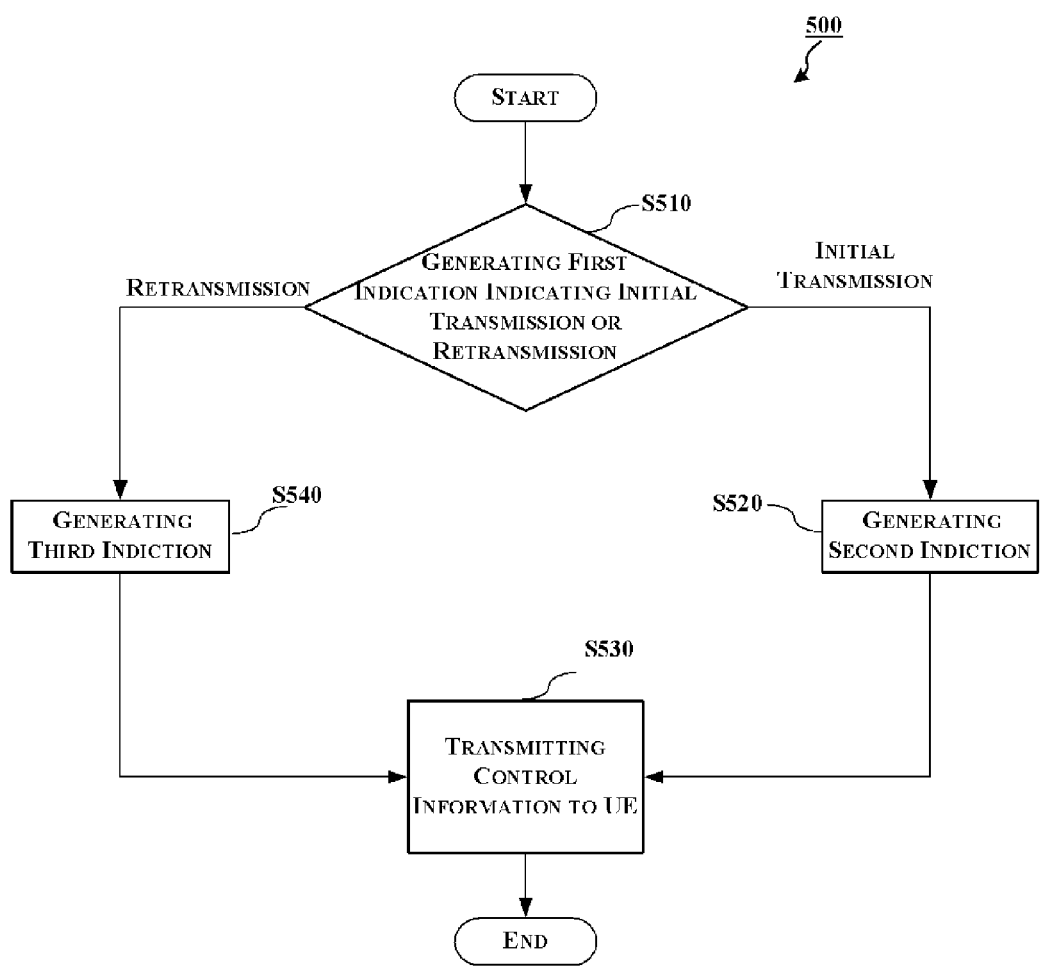
FIG. 5 shows a flowchart of a method 400 used in a BS for transmitting control information to a UE according to the first embodiment of the present disclosure.

FIG. 5 is a flowchart illustrating a method 500 used in a BS for transmitting control information to a UE according to the first embodiment of the present disclosure. In this embodiment, the control information may be transmitted via DCI. In other words, the control information represents several fields in DCI.

At step S510, the BS generates a first indication indicating whether data, which are downlink data transmitted from the BS to the UE or uplink data transmitted from the UE to the BS, are in an initial transmission or a retransmission. The first indication is comprised in the control information. For example, the first indication represents ITI for distinguishing the initial transmission from the retransmission. In this case, the first indication may be of one bit.

At step S520, if the data are in the initial transmission (i.e., RV0), the BS generates a second indication for determining modulation mode and TB size of the data. The second indication is comprised in the control information. Then, the BS transmits the control information to the UE at step S530.

For example, the second indication represents MCS as shown in FIG. 5, which may be of five bits.

The method 500 further includes an optional step S540.

At step S540, if the data are in the retransmission (e.g., RV1, RV2, or RV3), the BS generates a third indication indicating modulation mode and redundancy version for the retransmission of the data. The third indication is included in the control information. Then, the method 500 proceeds to step S530 for transmitting the control information including the third indication to the UE.

For example, the third indication represents MRV as shown in FIG. 5. In this case, the third indication may be of three bits.

In accordance to the first embodiment, the present disclosure may provide different MCS layouts for initial transmission and retransmission separately, thereby provide smaller granularity for TB size and thus decreasing the throughput loss caused by larger granularity for TB size. Moreover, the present disclosure only needs 7 bits for DL DCI and thus saves one bit as compared with the existing solutions (8 bits).

Figure 6:
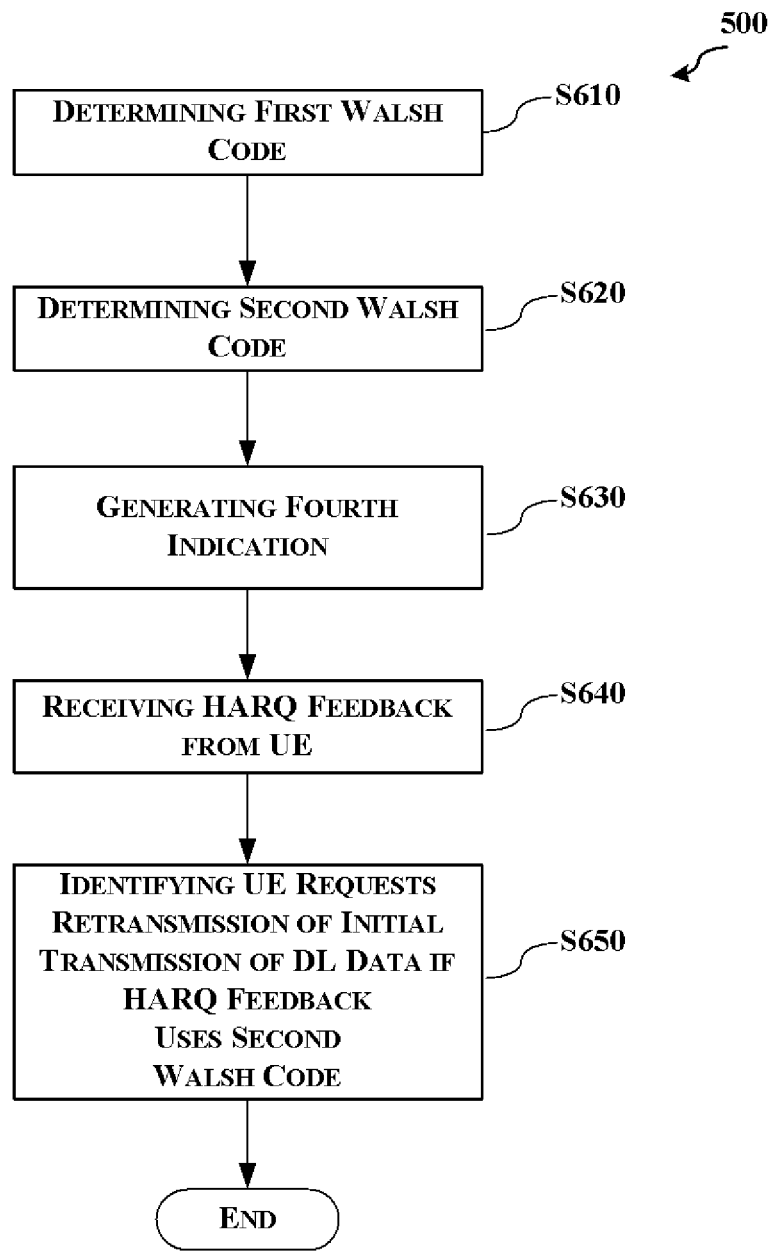
FIG. 6 shows one further implementation of the method 500 of FIG. 5 when the data are in the retransmission.

FIG. 6 shows one further implementation of the method 500 of FIG. 5 when the data are in the retransmission and the HARQ feedback is transmitted on PUCCH. As shown in FIG. 6, the method 500 further includes steps S610-S650, which occur when the data are downlink data.

At step S610, the BS determines a first Walsh code for the UE transmitting HARQ feedback based on a CCE index allocated to the UE. In accordance with the existing 3GPP specification, the first Walsh code may be derived according to the starting CCE index of downlink transmission, to which the HARQ feedback is directed.

At step S620, the BS determines a second Walsh code, which is used for the UE transmitting HARQ feedback of the downlink data when the UE requests the BS to retransmit the initial transmission of the downlink data, from one or more available Walsh codes other than the first Walsh code within the same PRB as that of the first Walsh code.

At step S630, the BS generates a fourth indication indicating the second Walsh code. The fourth indication is included in the control information. For example, the fourth indication represents R0I as shown in FIG. 3. In this case, the fourth indication may be of two bits and may be transmitted via any DCI format for the UE other than DCI0.

As an example, the fourth indication may be used to indicate an index of an unused Walsh code for the UE transmitting the HARQ feedback. The indicated Walsh code should be different from the original Walsh code derived from CCE index.

At step S640, the BS receives HARQ feedback of the downlink data from the UE.

At step S650, the BS identifies that the UE requests retransmission of the initial transmission of the downlink data if the HARQ feedback uses the second Walsh code. The operation not related to the second Walsh code will be performed in the existing manner and thus is omitted here.

As mentioned above, the fourth indication is included in the control information (cf. S530 in FIG. 5). Hence, it will be appreciated that steps S610-S630 may occur following the retransmission branch of step S510 but before step S530, and step S640 and S650 may occur after step S530.

Figure 7:
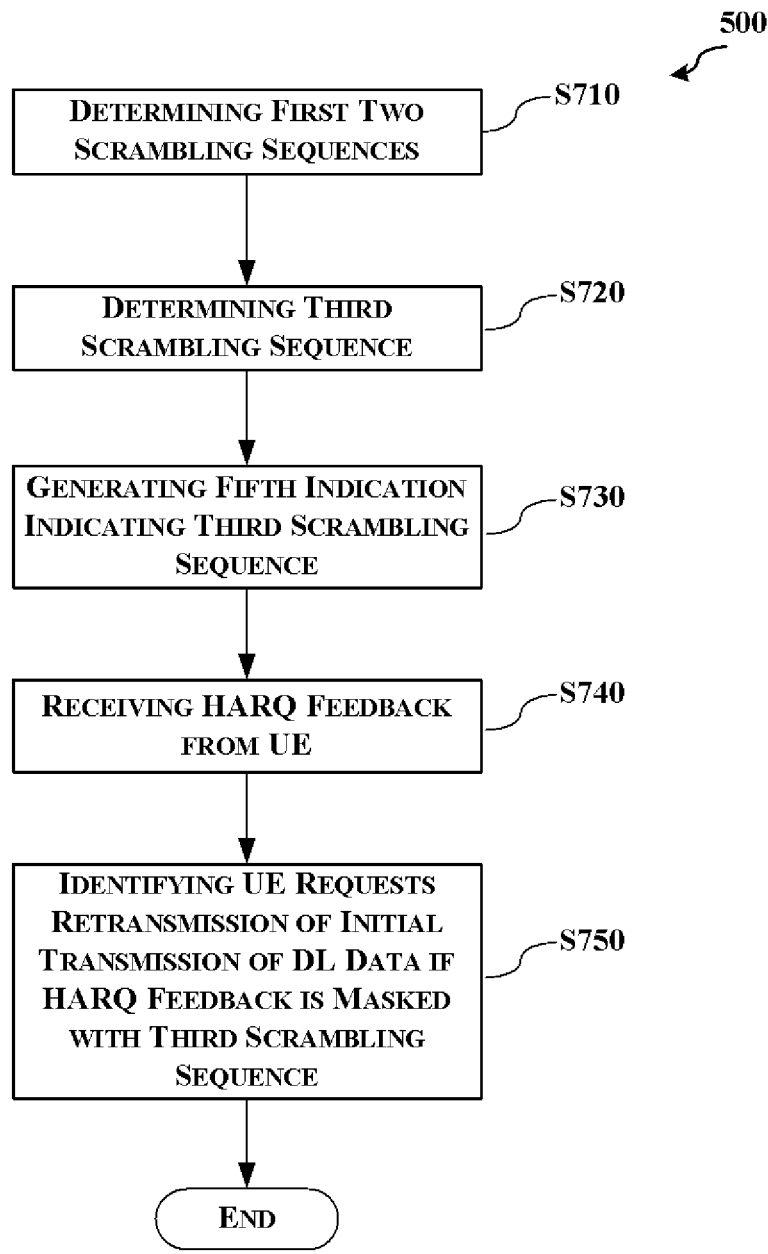
FIG. 7 shows another further implementation of the method 500 of FIG. 5 when the data are in the retransmission.

FIG. 7 shows another further implementation of the method 500 of FIG. 5 when the data are in the retransmission and the HARQ feedback is transmitted on PUSCH. As shown in FIG. 7, the method 500 further includes steps S710-S750, which occur when the data are uplink data.

At step S710, the BS determines first two scrambling sequences for the UE masking HARQ feedback of previous downlink data within a bundling window based on a total number of downlink transmissions within the bundling window. The previous downlink data here should be those before the uplink data in the bundling window.

At step S720, the BS determines a third scrambling sequence, which is used for the UE masking HARQ feedback of the previous downlink data when the UE requests the BS to retransmit an initial transmission of the previous downlink data, from available scrambling sequences other than the first two scrambling sequences.

At step S730, the BS generates a fifth indication indicating the third scrambling sequence, the fifth indication being comprised in the control information. For example, the fifth indication represents R0I as shown in FIG. 3. In this case, the fifth indication may be of two bits and may be transmitted via DCI0 for the UE.

At step S740, the BS receives HARQ feedback from the UE.

At step S750, the BS identifies that the UE requests retransmission of the initial transmission of the previous downlink data if the HARQ feedback is masked with the third scrambling sequence. The operation not related to the third scrambling sequence will be performed in the existing manner and thus is omitted here.

As mentioned above, the fifth indication is included in the control information (cf. S530 in FIG. 5). Hence, it will be appreciated that steps S710-S730 may occur following the retransmission branch of step S510 but before step S530, and step S740 and S750 may occur after step S530.

In according to the first embodiment, the present disclosure provides an efficient feedback mechanism for the UE to request the BS to retransmit RV0 again by changing HARQ feedback position without introducing other extra resource consumption.

Second Embodiment

Figure 8:
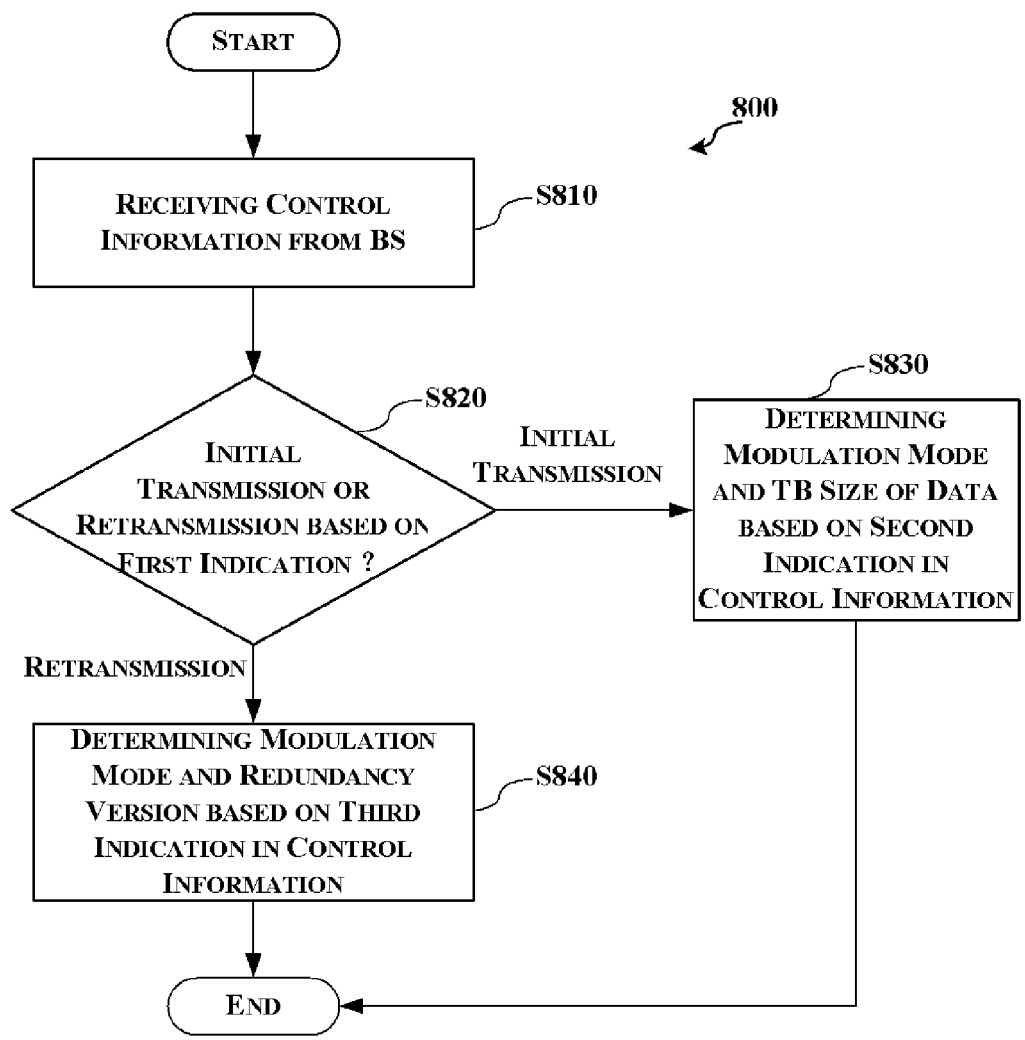
FIG. 8 shows a flowchart illustrating a method 800 used in a UE for handling control information from a BS according to the second embodiment of the present disclosure.

FIG. 8 is a flowchart illustrating a method 800 used in a UE for handling control information from a BS according to the second embodiment of the present disclosure.

At step S810, the UE receives the control information from the BS. In this embodiment, the control information may be received via DCI. In other words, the control information represents several fields in DCI.

At step S820, the UE determines whether data, which are downlink data transmitted from the BS to the UE or uplink data transmitted from the UE to the BS, are in an initial transmission or a retransmission based on a first indication comprised in the control information. For example, the first indication represents ITI for distinguishing the initial transmission from the retransmission. In this case, the first indication may be of one bit.

At step S830, if the data are in the initial transmission (i.e., RV0), the UE determines modulation mode and TB size of the data based on a second indication comprised in the control information. For example, the second indication represents MCS as shown in FIG. 3, which may be of five bits.

The method 800 further includes an optional step S840.

At step S840, if the data are in the retransmission (e.g., RV1, RV2, or RV3), the UE determines modulation mode and redundancy version for the retransmission of the data based on a third indication comprised in the control information. For example, the third indication represents MRV as shown in FIG. 3. In this case, the third indication may be of three bits.

In accordance to the second embodiment, the present disclosure may provide different MCS layouts for initial transmission and retransmission separately, thereby provide smaller granularity for TB size and thus decreasing the throughput loss caused by larger granularity for TB size. Moreover, the present disclosure only needs 7 bits for DL DCI and thus saves one bit as compared with the existing solutions (8 bits).

Figure 9:
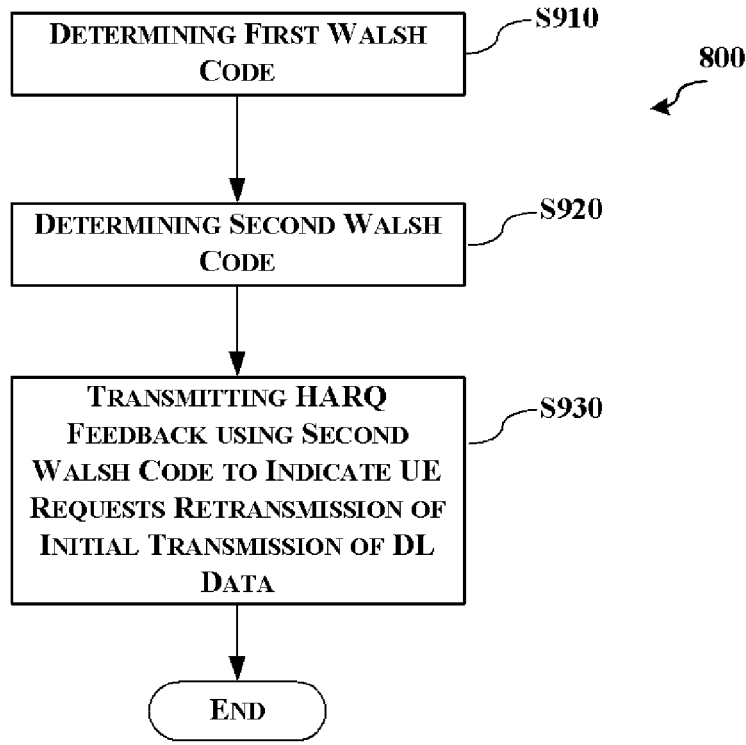
FIG. 9 shows one further implementation of the method 800 of FIG. 8 when the data are in the retransmission.

FIG. 9 shows one further implementation of the method 800 of FIG. 8 when the data are in the retransmission and the HARQ feedback is transmitted on PUCCH. As shown in FIG. 9, the method 800 further includes steps S910-S930, which occur when the data are downlink data.

At step S910, the UE determines a first Walsh code for transmitting HARQ feedback based on a CCE index allocated to the UE. In accordance with the existing 3GPP specification, the first Walsh code may be derived according to the starting CCE index of downlink transmission, to which the HARQ feedback is directed.

At step S920, the UE determines a second Walsh code, which is used for the UE transmitting HARQ feedback of the downlink data when the UE requests the BS to retransmit the initial transmission of the downlink data, based on a fourth indication included in the control information, the second Walsh code being selected from one or more available Walsh codes other than the first Walsh code within the same PRB as that of the first Walsh code.

For example, the fourth indication represents R0I as shown in FIG. 3. In this case, the fourth indication may be of two bits and may be transmitted via any DCI format for the UE other than DCI0. As an example, the fourth indication here may be used to indicate an index of an unused Walsh code for the UE transmitting the HARQ feedback. The indicated Walsh code should be different from the original Walsh code derived from CCE index.

At step S930, the UE transmits HARQ feedback of the downlink data to the BS using the second Walsh code to indicate that the UE requests retransmission of the initial transmission of the downlink data.

As mentioned above, the fourth indication is included in the control information (cf. S810 in FIG. 8). Hence, it will be appreciated that steps S910-S920 may occur following the retransmission branch of step S810, either before or after step S840, and step S930 may occur after step S840.

Figure 10:
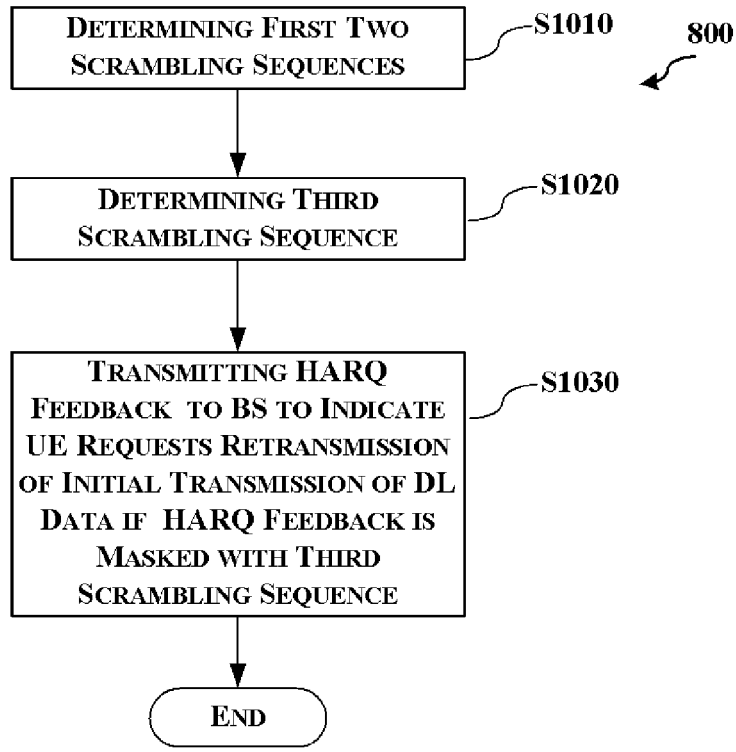
FIG. 10 shows another further implementation of the method 800 of FIG. 8 when the data are in the retransmission.

FIG. 10 shows another further implementation of the method 800 of FIG. 8 when the data are in the retransmission and the HARQ feedback is transmitted on PUSCH. As shown in FIG. 10, the method 800 further includes steps S1010-S1030, which occur when the data are uplink data.

At step S1010, the UE determines first two scrambling sequences for the UE masking HARQ feedback of previous downlink data within a bundling window based on a total number of downlink transmissions within the bundling window. The previous downlink data here should be those before the uplink data in the bundling window.

At step S1020, the UE determines a third scrambling sequence, which is used for the UE masking HARQ feedback of the previous downlink data when the UE requests the BS to retransmit an initial transmission of the previous downlink data, based on a fifth indication comprised in the control information. The third scrambling sequence is selected from available scrambling sequences other than the first two scrambling sequences.

For example, the fifth indication represents R0I as shown in FIG. 3. In this case, the fifth indication may be of two bits and may be transmitted via DCI0 for the UE.

At step S1030, the UE transmits the HARQ feedback to the BS to indicate that the UE requests retransmission of the initial transmission of the previous downlink data if the HARQ feedback is masked with the third scrambling sequence.

As mentioned above, the fifth indication is included in the control information (cf. S810 in FIG. 8). Hence, it will be appreciated that steps S1010-S1020 may occur following the retransmission branch of step S810, either before or after step S840, and step S1030 may occur after step S840.

In according to the second embodiment, the present disclosure provides an efficient feedback mechanism for the UE to request the BS to retransmit RV0 again by changing HARQ feedback position without introducing other extra resource consumption.

Third Embodiment

Figure 11:
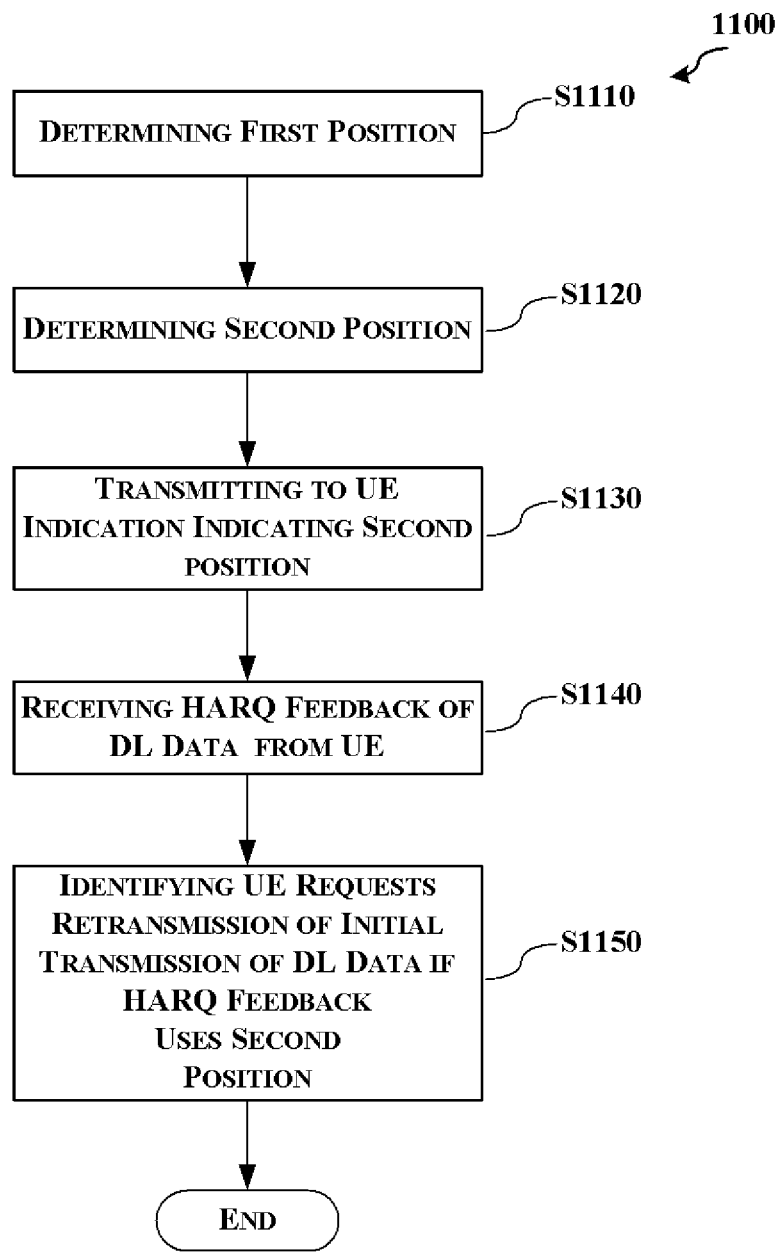
FIG. 11 illustrates a flowchart illustrating a method 1100 used in a BS for identifying that a UE requests the BS to retransmit an initial transmission of downlink data according to the third embodiment of the present disclosure.

FIG. 11 is a flowchart illustrating a method 1100 used in a BS for identifying that a UE requests the BS to retransmit an initial transmission of downlink data according to the third embodiment of the present disclosure.

At step S1110, the BS determines a first position, which is used for the UE transmitting HARQ feedback when the UE does not request the BS to retransmit the initial transmission of the downlink data.

At step S1120, the BS determines a second position, which is used for the UE transmitting HARQ feedback of the downlink data when the UE requests the BS to retransmit the initial transmission of the downlink data. The second position is different from the first position.

At step S1130, the BS transmits to the UE an indication indicating the second position.

At step S1140, the BS receives HARQ feedback of the downlink data from the UE.

At step S1150, the BS identifies that the UE requests retransmission of the initial transmission of the downlink data if the HARQ feedback uses the second position.

As an example, when the HARQ feedback is transmitted on PUCCH, the first position may be indicated by a first Walsh code, which is determined based on a CCE index allocated to the UE, and the second position may be indicated by a second Walsh code, which is determined from one or more available Walsh codes other than the first Walsh code within the same PRB as that of the first Walsh code.

As another example, when the HARQ feedback is transmitted on PUSCH, the first position may be indicated by first two scrambling sequences, which are determined based on a total number of downlink transmissions within a bundling window, and the second position, may be indicated by a third scrambling sequence, which is determined from available scrambling sequences other than the first two scrambling sequences.

It will be appreciated that the present disclosure is not limited to the above two examples, and any other suitable examples may be applied to the first position and the second position.

Fourth Embodiment

Figure 12:
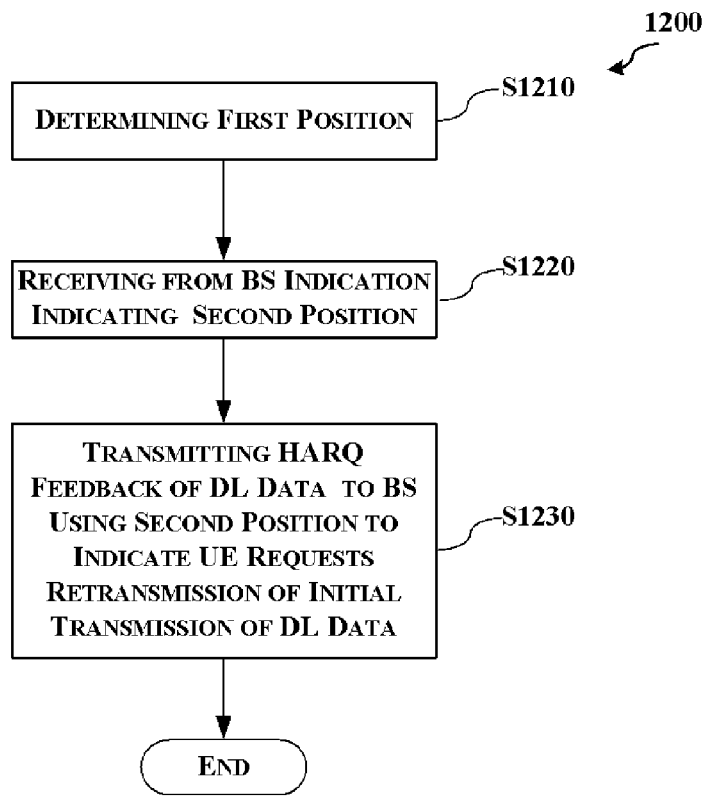
FIG. 12 illustrates a flowchart illustrating a method 1200 used in a UE for requesting a BS to retransmit an initial transmission of downlink data according to the fourth embodiment of the present disclosure.

FIG. 12 is a flowchart illustrating a method 1200 used in a UE for requesting a BS to retransmit an initial transmission of downlink data according to the fourth embodiment of the present disclosure.

At step S1210, the UE determines a first position, which is used for the UE transmitting HARQ feedback when the UE does not request the BS to retransmit the initial transmission of the downlink data/At step S1220, the UE receives from the BS an indication indicating a second position, which is used for the UE transmitting HARQ feedback of the downlink data when the UE requests the BS to retransmit the initial transmission of the downlink data. The second position is different from the first position.

At step S1230, the UE transmits HARQ feedback of the downlink data to the BS using the second position to indicate that the UE requests retransmission of the initial transmission of the downlink data.

As an example, when the HARQ feedback is transmitted on PUCCH, the first position may be indicated by a first Walsh code, which is determined based on a CCE index allocated to the UE, and the second position may be indicated by a second Walsh code, which is determined from one or more available Walsh codes other than the first Walsh code within the same PRB as that of the first Walsh code.

As another example, when the HARQ feedback is transmitted on PUSCH, the first position may indicated by first two scrambling sequences, which are determined based on a total number of downlink transmissions within a bundling window, and the second position may be indicated by a third scrambling sequence, which is determined from available scrambling sequences other than the first two scrambling sequences.

It will be appreciated that the present disclosure is not limited to the above two examples, and any other suitable examples may be applied to the first position and the second position.

In according to the third and fourth embodiments, the UE may request the BS to retransmit the initial transmission of the downlink data by replacing HARQ feedback's initial position with a new position, which is indicated by R0I. This provides an efficient feedback mechanism for the UE to request the BS to retransmit RV0 by utilizing unused HARQ position without introducing extra resource consumption.

Hereunder, examples of procedures of requesting the BS to retransmit the initial transmission (i.e., RV0) by means of HARQ feedback transmitted on PUCCH using R0I as shown in FIG. 3 will be explained in details by employing 2 types of relationship between $UE_{grp}$ and $UE_{ROI}$ on a basis of the Walsh code definition as listed in the following Table 2.

In according to the existing 3GPP specification, HARQ feedback is modulated on 12-size ZC sequence at frequency domain, which can provide up to 12 orthogonal phase shifts. On each phase shift, it can hold at most 4 UEs' HARQ feedbacks independently by spreading frequency using length-4 Walsh code at time domain. However, due to maximum 3 Demodulation Reference Signal (DMRS) symbols limit in the middle, at most 3 UEs' HARQ feedback can be multiplexed into one ZC sequence.

Actually, not all Walsh codes are occupied in the real deployment. Instead, in most cases, more than 50% Walsh codes are idle. In this way, those idle Walsh codes at the same PRB as the original Walsh code derived from CCE index can also be used by UE to carry more information.

Table 2 shows a Walsh code definition as specified in the existing 3GPP specification (by referring to 3GPP TS 36.213, Table 5.4.1-2)

TABLE 2

| Walsh code definition | |
|---|---|
| Sequence index $n_{oc}$ ($n_s$) | Orthogonal sequences $[w(0) \ldots w(N_{SF}^{PUCCH} - 1)]$ |
| 0 | [+1 +1 +1 +1] |
| 1 | [+1 −1 +1 −1] |
| 2 | [+1 −1 −1 +1] |
| 3 | [+1 +1 −1 −1] |

Example 1—Type 1/3 ($UE_{grp}$=3, $UE_{ROI}$=1)

$UE_{ROI}$ means the number of UEs within the same ZC phase shift group, which may requests BS to retransmit the initial version of downlink data. $UE_{grp}$ means the number of UEs within the same ZC shift group.

This example relates to a scenario where 3 UEs (e.g., UE1, UE2, and UE3 in FIG. 13) with adjacent CCE indexes are packed into same ZC sequence shift group, and there is at most only one UE (e.g., UE1 in this example) may request BS to retransmit its initial version of downlink data.

Figure 13:
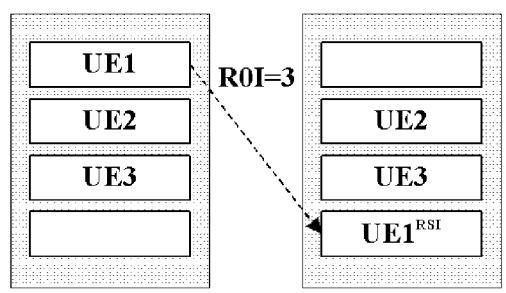
FIG. 13 illustrates how UE1 requests BS to retransmit its initial transmission of downlink data in Example 1.

FIG. 13 illustrates how UE1 requests the BS to retransmit the initial transmission of the downlink data in this example. As shown in FIG. 13, UE1's original HARQ position is at walsh00, and UE2 and UE3 have respective original HARQ positions at Walsh01 and Walsh02, respectively. The unused walsh03 is also allocated to UE1. Then, if UE1 requests retransmission of the initial transmission of the downlink data, UE1 may transmit its HARQ feedback using walsh03 instead of walsh00. When receiving UE1's HARQ feedback on walsh03, the BS will not only get the HARQ feedback, but also identify that UE1 requests retransmission of the initial transmission of the downlink data.

In this example, UE1 can notify the BS that it requests retransmission of the initial transmission of the downlink data by changing the Walsh code for transmitting the HARQ feedback.

Example 2—Type 2/2 ($UE_{grp}$=2, $UE_{ROI}$=2)

This example is related to a scenario where 2 UEs (e.g., UE1 and UE2 in FIG. 14) are packed into the same ZC sequence shift group, and these two UEs both need to request the BS to retransmit respective initial transmission of downlink data.

Figure 14:
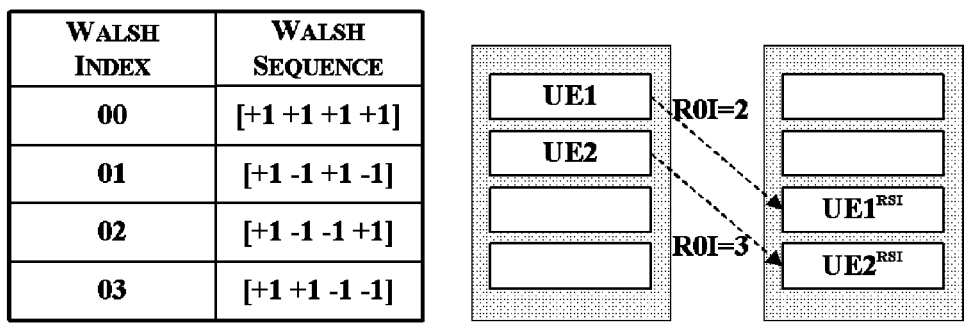
FIG. 14 illustrates how UE1 and UE2 request BS to retransmit respective initial transmission of downlink data in Example 2.

FIG. 14 illustrates how UE1 and UE2 request the BS to retransmit the initial transmission of the downlink data in this example. As shown in FIG. 14, UE1's original HARQ position is at walsh00, and UE2's original HARQ position is at walsh01. Accordingly, UE1 will use walsh02 instead of the original walsh00 as the second Walsh code to transmit HARQ feedback, and UE2 will use walsh03 instead of walsh01 as the second Walsh code to transmit HARQ feedback. When receiving UE1's HARQ feedback on walsh02, the BS will not only get the HARQ feedback, but also identify that UE1 requests the BS to retransmit the initial transmission of the downlink data. Similarly, when receiving UE2's HARQ feedback on walsh03, the BS will not only get the HARQ feedback, but also identify that UE2 requests the BS to retransmit the initial transmission of the downlink data.

In this example, both UE1 and UE2 can request the BS to retransmit the initial transmission of the downlink data by changing respective Walsh codes for transmitting HARQ feedback.

In accordance with the present disclosure, if no secondary Walsh code is assigned to UE, R0I is just set to its normal Walsh code. Upon finding R0I same as its normal Walsh code derived from its CCE index, UE is aware of no extra Walsh code booked for itself at current sub-frame, then it has to wait for a next retransmission opportunity for the missing RV0. Otherwise, if the BS assigns an idle Walsh code and sets the Walsh code (e.g., an index of the Walsh code) into R0I. Upon detecting R0I different from its normal Walsh code, the UE knows the extra Walsh code allocated to it. Once really losing RV0, UE can use the extra Walsh code to reply NACK to trigger the BS to retransmit RV0 again.

The above solution is applicable to HARQ feedback on PUCCH. When multiplexed with uplink data on PUSCH, the HARQ feedback will go through encoding and rate matching to expected bits and then is masked using a scrambling sequence chosen from the following table according to formula:

$$i=(N_{bundled}-1) \bmod 4.$$

Specifically, the chosen scrambling sequence is different from the initial two scrambling sequences for the UE masking HARQ feedback of previous downlink data within a bundling window. In accordance with the existing 3GPP specification, the initial two scrambling sequences may be derived based on a total number of downlink transmissions within the bundling window.

TABLE 3

Scrambling sequence selection for TDD ACK/NACK bundling

| i | $[w_0^{ACK} w_1^{ACK} w_2^{ACK} w_3^{ACK}]$ |
|---|---|
| 0 | [1 1 1 1] |
| 1 | [1 0 1 0] |
| 2 | [1 1 0 0] |
| 3 | [1 0 0 1] |

Unlike R0I used in HARQ feedback on PUCCH, which indicates an index for a Walsh code, R0I in HARQ feedback PUSCH refers to an index for the above new scrambling sequence for the UE to indicate the BS that the previous downlink transmission need to be rolled back to RV0.

Figure 15:
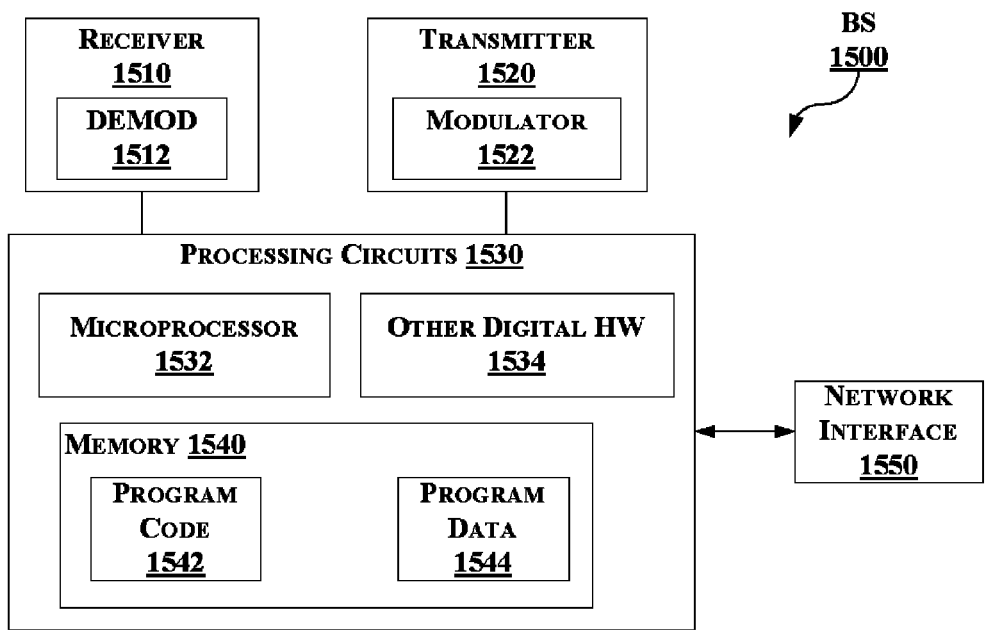
FIG. 15 is a block diagram of a BS 1500 configured according to the present disclosure.

FIG. 15 is a block diagram of a BS 1500 for transmitting control information to a UE or for identifying that the UE requests the BS to retransmit an initial transmission of downlink data according to the present disclosure. In particular, the BS 1500 may be configured to implement the method as illustrated in FIG. 5, FIG. 6, FIG. 7, or FIG. 11, or variants thereof.

As shown, the BS 1500 includes a receiver 1510, which includes at least two antennas and various other radio-frequency components (not shown) and a demodulator 1512. The receiver 1510 receives radio signals received from one or more wireless BS, and processes the signals by using known radio processing and signal processing techniques, to convert the received radio signals into digital samples for processing circuits 1530. The processing circuits 1530 extract data from signals received via the receiver 1510 and generate information for transmission to the UE via transmitter 1520. Like the receiver 1510 and the demodulator 1512, the transmitter 1520 and modulator 1522 use known radio processing and signal processing components and techniques, typically according to one or more telecommunications standards, and are configured to format digital data and generate and condition a radio signal, from that data, for transmission over the air.

The processing circuits 1530 include one or several microprocessors 1532, digital signal processors, and the like, as well as other digital hardware 1534 and memory 1540. The memory 1540, which may include one or several types of memory such as read-only memory (ROM), random-access memory (RAM), cache memory, flash memory devices, optical storage devices, etc., stores program code 1542 for executing one or more telecommunications and/or data communications protocols and for carrying out one or more of the techniques for transmitting control information described herein. Memory 1540 may further store program data 1544 as well as buffered traffic data received from UEs and from network interface 1550, and also stores various parameters, predetermined threshold values, and/or other program data for controlling the general operation of the BS 1500.

In some embodiments, the processing circuits 1530, using appropriate program code 1542 stored in the memory 1540, are configured to implement one or more methods or steps described above. Of course, not all of the steps of these methods are necessarily performed in a single microprocessor or even in a single module.

Figure 16:
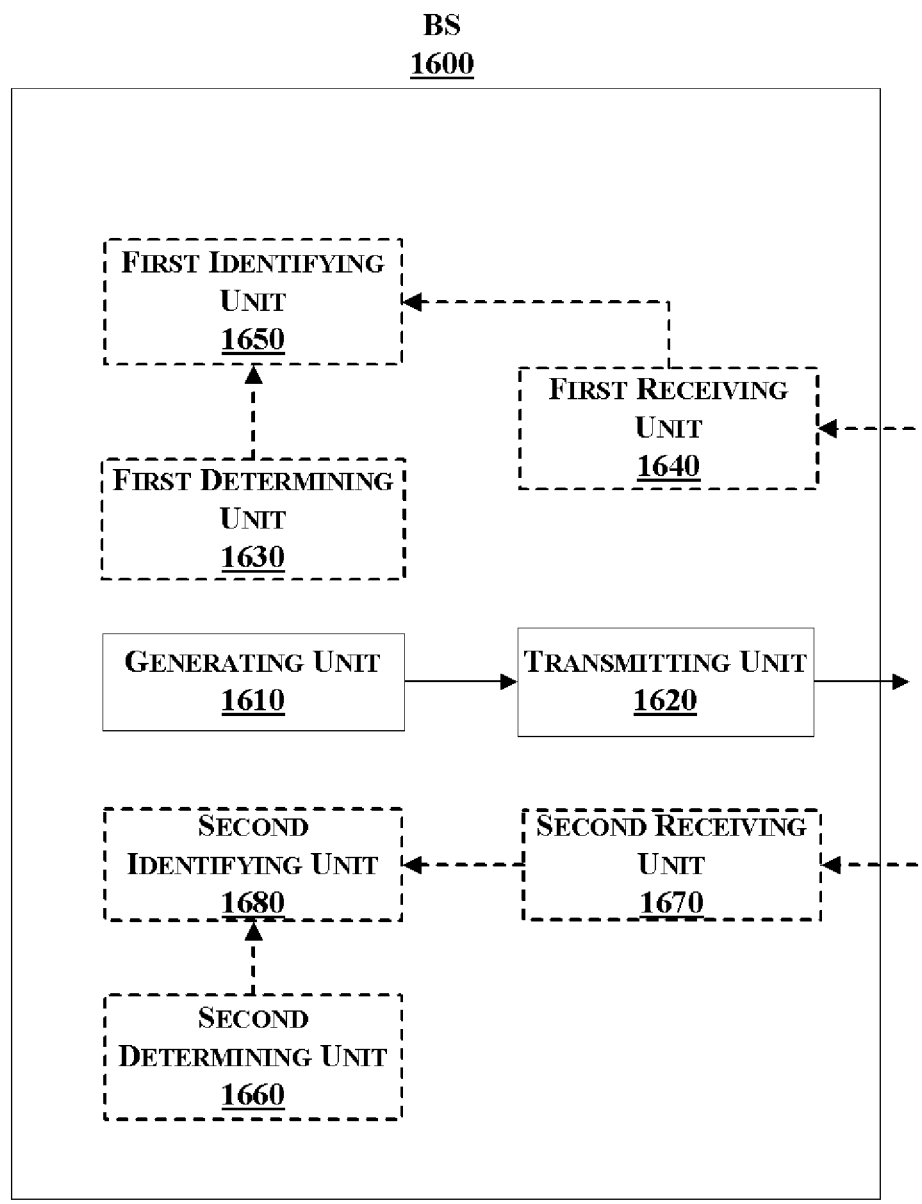
FIG. 16 illustrates a BS 1600 according to the present disclosure.

FIG. 16 presents a block diagram of a BS 1600 configured to carry out one or several of control information transmitting techniques discussed herein according to the present disclosure. The BS 1600 may have a physical configuration like that illustrated in FIG. 15, and may be implemented as hardware, software or a combination of hardware and software. In any case, however, the BS 1600 is configured to implement at least two functions, which are pictured in FIG. 16 as a generating unit 1610 and a transmitting unit 1620. For example, the generating unit 1610 may be embodied in the processing circuits 1530 as shown in FIG. 15. Similarly, the transmitting unit 1620 may be embodied in the transmitter 1520 as shown in FIG. 15, respectively.

The generating unit 1610 is configured to generate a first indication indicating whether data, which are downlink data transmitted from the BS to the UE or uplink data transmitted from the UE to the BS, are in an initial transmission or a retransmission. The first indication is included in the control information.

If the data are in the initial transmission, the generating unit 1610 is configured to generate a second indication for determining modulation mode and TB size of the data. The second indication is included in the control information. The transmitting unit 1620 is configured to transmit the control information to the UE.

If the data are in the retransmission, the generating unit 1610 is configured to generate a third indication indicating modulation mode and redundancy version for the retransmission of the data. The third indication is included in the control information. The transmitting unit 1620 is configured to transmit the control information to the UE.

Optionally, if the data are downlink data and the downlink data are in the retransmission, the BS 1600 may further include a first determining unit 1630, a first receiving unit 1640, and a first identifying unit 1650.

The first determining unit 1630 is configured to determine a first Walsh code for the UE transmitting HARQ feedback based on a CCE index allocated to the UE. The first determining unit 1630 is further configured to determine a second Walsh code, which is used for the UE transmitting HARQ feedback of the downlink data when the UE requests the BS to retransmit the initial transmission of the downlink data, from one or more available Walsh codes other than the first Walsh code within the same PRB as that of the first Walsh code. The generating unit 1610 is further configured to generate a fourth indication indicating the second Walsh code. The fourth indication is included in the control information. The first receiving unit 1640 is configured to receive HARQ feedback of the downlink data from the UE. The first identifying unit 1650 is configured to identify that the UE requests retransmission of the initial transmission of the downlink data if the HARQ feedback uses the second Walsh code.

Optionally, if the data are uplink data and the uplink data are in the retransmission, the BS 1600 further includes a second determining unit 1660, a second receiving unit 1670, and a second identifying unit 1680.

The second determining unit 1660 is configured to determine first two scrambling sequences for the UE masking HARQ feedback of previous downlink data within a bundling window based on a total number of downlink transmissions within the bundling window. The previous downlink data here should be those before the uplink data in the bundling window. The second determining unit 1660 is further configured to determine a third scrambling sequence, which is used for the UE masking HARQ feedback of the previous downlink data when the UE requests the BS to retransmit an initial transmission of the previous downlink data, from available scrambling sequences other than the first two scrambling sequences. The generating unit 1610 is further configured to generate a fifth indication indicating the third scrambling sequence. The fifth indication is included in the control information. The second receiving unit 1670 is configured to receive HARQ feedback of the previous downlink data from the UE. The second identifying unit 1680 is configured to identify that the UE requests retransmission of the initial transmission of the previous downlink data if the HARQ feedback is masked with the third scrambling sequence.

Optionally, the transmitting unit 1620 is further configured to transmit the control information via Downlink Control Information, DCI. In this case, if the data are in the initial transmission, the first indication is of one bit, and the second indication is of five bits. If the data are in the retransmission, the first indication is of one bit, and the third indication is of three bits.

It should be noted that two or more different units in this disclosure may be logically or physically combined. For example, the first receiving unit 1640 and the second receiving unit 1670 may be combined as one single unit, e.g., the receiver 1510 in FIG. 15. Similarly, the first identifying unit 1650 and the second identifying unit 1680 may be realized by a single unit, e.g., the processing circuits 1530 as shown in FIG. 15.

Figure 17:
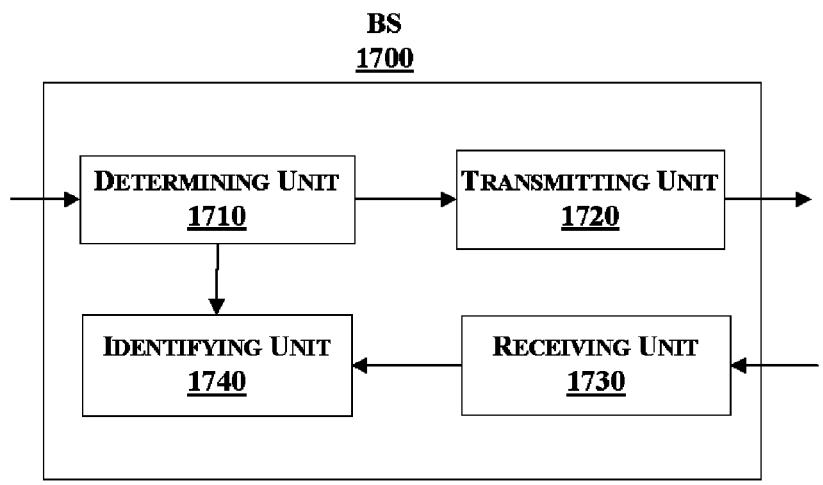
FIG. 17 illustrates a BS 1700 according to the present disclosure.

FIG. 17 presents a block diagram of a BS 1700 configured to carry out one or several of techniques for identifying that a UE requests the BS to retransmit an initial transmission of downlink data described herein. The BS 1700 may have a physical configuration like that illustrated in FIG. 15, and may be implemented as hardware, software or a combination of hardware and software. In any case, however, the BS 1700 is configured to implement at least four functions, which are pictured in FIG. 17 as a determining unit 1710, a transmitting unit 1720, a receiving unit 1730, and an identifying unit 1740. For example, the determining unit 1710 and the identifying unit 1740 may be embodied in the processing circuits 1530 as shown in FIG. 15. Similarly, the transmitting unit 1720 and the receiving unit 1730 may be embodied in the transmitter 1520 and the receiver 1510 as shown in FIG. 15, respectively.

The determining unit 1710 is configured to determine a first position, which is used for the UE transmitting HARQ feedback when the UE does not request the BS to retransmit the initial transmission of the downlink data.

The determining unit 1710 is further configured to determine a second position, which is used for the UE transmitting HARQ feedback of the downlink data when the UE requests the BS to retransmit the initial transmission of the downlink data, the second position being different from the first position.

The transmitting unit 1720 is configured to transmit to the UE an indication indicating the second position.

The receiving unit 1730 is configured to receive HARQ feedback of the downlink data from the UE.

The identifying unit 1740 is configured to identify that the UE requests retransmission of the initial transmission of the downlink data if the HARQ feedback uses the second position.

Optionally, e.g., when the HARQ feedback is transmitted on PUCCH, the first position is indicated by a first Walsh code, which is determined based on a CCE index allocated to the UE. In this case, the second position is indicated by a second Walsh code, which is determined from one or more available Walsh codes other than the first Walsh code within the same PRB as that of the first Walsh code.

Optionally, e.g., when the HARQ feedback is transmitted on PUSCH, the first position is indicated by first two scrambling sequences, which are determined based on a total number of downlink transmissions within a bundling window. In this case, the second position is indicated by a third scrambling sequence, which is determined from available scrambling sequences other than the first two scrambling sequences.

Figure 18:
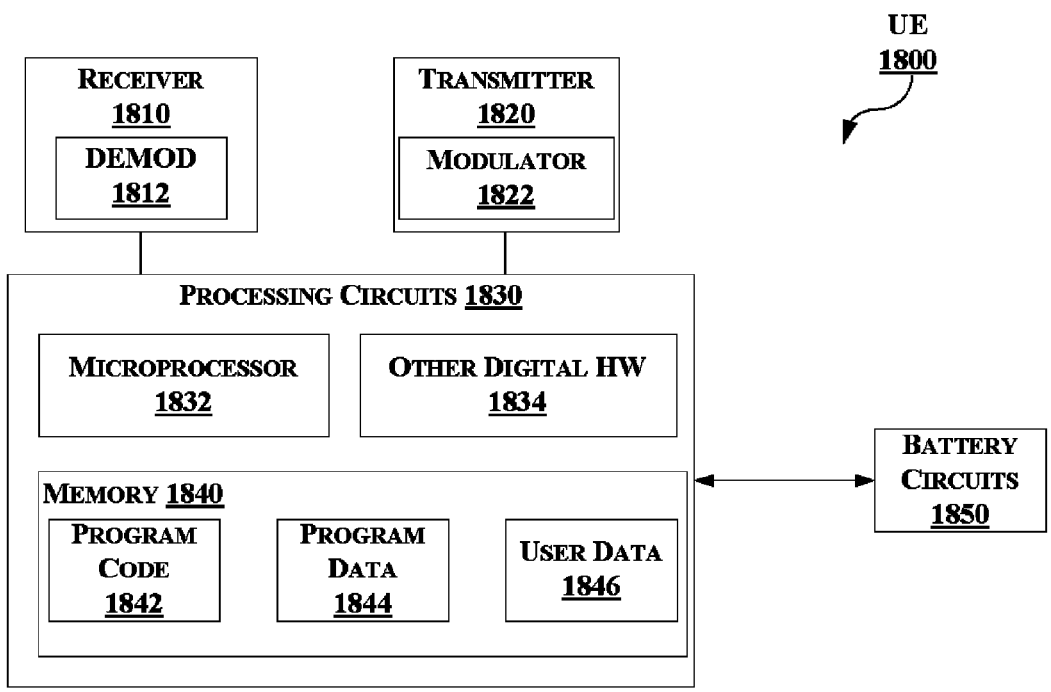
FIG. 18 is a block diagram of a UE 1800 configured according to the present disclosure.

FIG. 18 is a block diagram of a UE 1800 for handling control information from a BS or for requesting a BS to retransmit an initial transmission of downlink data according to the present disclosure. In particular, UE 1800 may be configured to participate in the method illustrated in FIG. 8, FIG. 9, FIG. 10, or FIG. 12, or variants thereof.

As shown, the UE 1800 includes a receiver 1810, which includes at least two antennas and various like radio-frequency components (not shown) and a demodulator 1812. The receiver 1810 receives radio signals received from one or more BSs, and processes the signals by using known radio processing and signal processing techniques, for the processor circuits 1830. The processing circuits 1830 extract data from signals received via the receiver 1810 and generate information for transmission to a corresponding BS via the transmitter 1820. Like the receiver 1810 and the demodulator 1812, the transmitter 1820 and the modulator 1822 use known radio processing and signal processing components and techniques, typically according to a particular telecommunications standard such as LTE and LTE-A (Advanced), and are configured to format digital data and generate and condition a radio signal for transmission over the air.

The processing circuits 1830 include one or several microprocessors 1832, digital signal processors, and the like, as well as other digital hardware 1834 and memory 1840. The memory 1840, which includes one or several types of memory such as read-only memory (ROM), random-access memory (RAM), cache memory, flash memory devices, optical storage devices, etc., stores program code 1842 for executing one or more telecommunications and/or data communications protocols and for carrying out one or more of the techniques described herein. The memory 1840 further stores program data 1844, user data 1846 received from the BS and to be transmitted to the BS, and also stores various parameters, pre-determined threshold values, and/or other program data for controlling the operation of the UE 1800. The UE 1800 includes various other features that are not shown, in addition to the battery circuits 1850 pictured in FIG. 18; these features, such as user interface circuitry, positioning circuits, and the like, are well known to those skilled in the art and are therefore not illustrated.

In various embodiments, the processing circuits 1830, using appropriate program code 1842 stored in the memory 1840, are configured to implement one or more methods or steps described above. Of course, not all of the steps of these techniques are necessarily performed in a single microprocessor or even in a single module.

Figure 19:
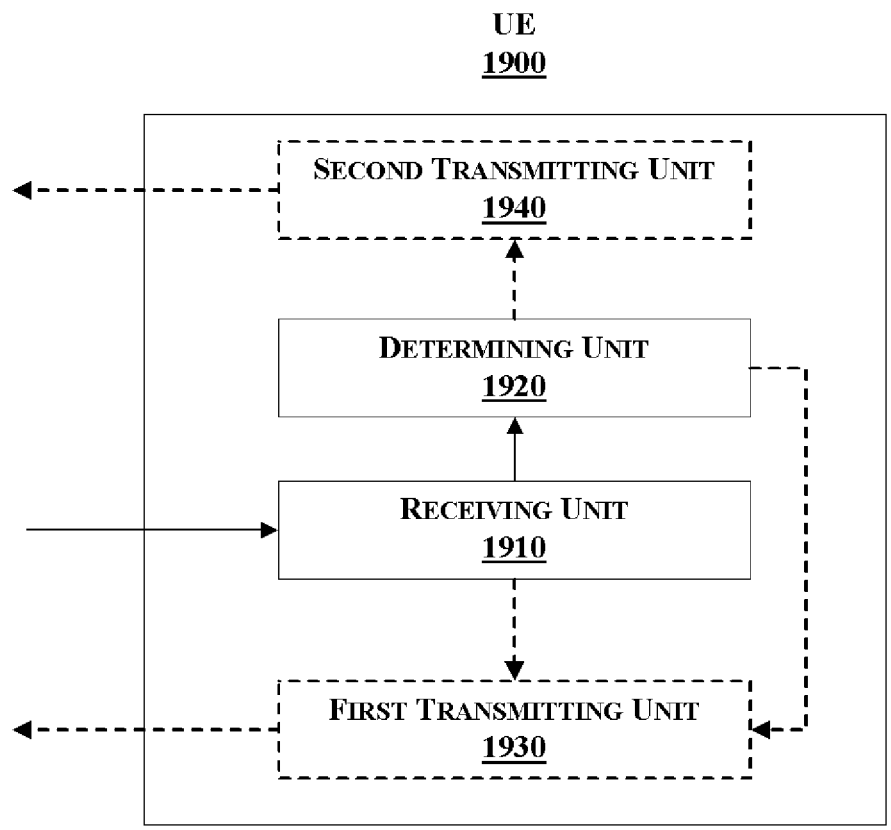
FIG. 19 illustrates a UE 1900 according to the present disclosure.

FIG. 19 presents a block diagram of a UE 1900 configured to carry out one or several of the control information handling techniques described herein. The UE 1900 may have a physical configuration like that illustrated in FIG. 18, and may be implemented as hardware, software or a combination of hardware and software. In any case, however, the UE 1900 is configured to implement at least two functions, which are pictured in FIG. 19 as a receiving unit 1910 and a determining unit 1920. For example, the receiving unit 1910 may be embodied in the receiver 1810 as shown in FIG. 18. Similarly, the determining unit 1920 may be embodied in the processing circuits 1830 as shown in FIG. 18.

The receiving unit 1910 is configured to receive the control information from the BS.

The determining unit 1920 is configured to determine whether data, which are downlink data transmitted from the BS to the UE or uplink data transmitted from the UE to the BS, are in an initial transmission or a retransmission based on a first indication comprised in the control information.

If the data are in the initial transmission, the determining unit 1920 is further configured to determine modulation mode and TB size of the data based on a second indication comprised in the control information.

Optionally, if the data are in the retransmission, the determining unit 1920 is further configured to determine modulation mode and redundancy version for the retransmission of the data based on a third indication comprised in the control information.

Optionally, if the data are downlink data and are in the retransmission, the UE 1900 further includes a first transmitting unit 1930.

In this case, the determining unit 1920 is further configured to determine a first Walsh code for transmitting HARQ feedback based on a CCE index allocated to the UE. The determining unit 1920 is further configured to determine a second Walsh code, which is used for the UE transmitting HARQ feedback of the downlink data when the UE requests the BS to retransmit the initial transmission of the downlink data, based on a fourth indication comprised in the control information, the second Walsh code being selected from one or more available Walsh codes other than the first Walsh code within the same PRB as that of the first Walsh code. The first transmitting unit 1930 is configured to transmit HARQ feedback of the downlink data to the BS using the second Walsh code to indicate that the UE requests retransmission of the initial transmission of the downlink data.

Optionally, if the data are uplink data and are in the retransmission, the UE 1900 further includes a second transmitting unit 1940.

In this case, the determining unit 1920 is further configured to determine first two scrambling sequences for the UE masking HARQ feedback of previous downlink data within a bundling window based on a total number of downlink transmissions within the bundling window. The previous downlink data here should be those before the uplink data in the bundling window. The determining unit 1920 is further configured to determine a third scrambling sequence, which is used for the UE masking HARQ feedback of the previous downlink data when the UE requests the BS to retransmit an initial transmission of the previous downlink data, based on a fifth indication comprised in the control information. The third scrambling sequence is selected from available scrambling sequences other than the first two scrambling sequences. The second transmitting unit 1940 is configured to transmit the HARQ feedback to the BS to indicate that the UE requests retransmission of the initial transmission of the previous downlink data if the HARQ feedback is masked with the third scrambling sequence.

Optionally, the receiving unit 1910 is further configured to receive the control information via DCI. In this case, if the data are in the initial transmission, the first indication is of one bit, and the second indication is of five bits; and if the data are in the retransmission, the first indication is of one bit, and the third indication is of three bits.

It should be noted that two or more different units in this disclosure may be logically or physically combined. For example, the first transmitting unit 1930 and the second transmitting unit 1940 may be combined as one single unit, e.g., the transmitter 1820 in FIG. 18.

Figure 20:
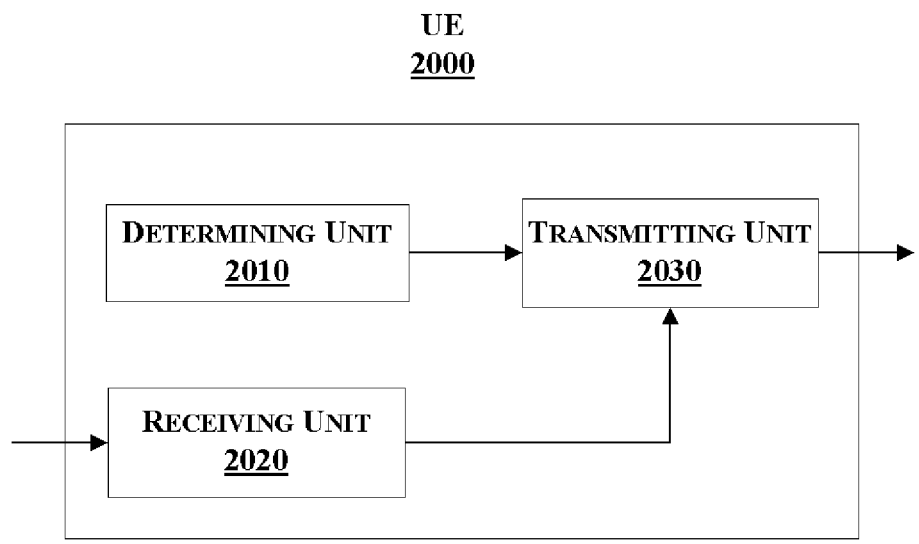
FIG. 20 illustrates a UE 2000 according to the present disclosure.

FIG. 20 presents a block diagram of a UE 2000 configured to carry out one or several of techniques for requesting a BS to retransmit an initial transmission of downlink data described herein. The UE 2000 may have a physical configuration like that illustrated in FIG. 18, and may be implemented as hardware, software or a combination of hardware and software. In any case, however, the UE 2000 is configured to implement at least two functions, which are pictured in FIG. 20 as a determining unit 2010, a receiving unit 2020, and a transmitting unit 2030. For example, the determining unit 2010 may be embodied in the processing circuits 1830 as shown in FIG. 18. Similarly, the receiving unit 2020 and the transmitting unit 2030 may be embodied in the receiver 1810 and the transmitter 1820 as shown in FIG. 18, respectively.

The determining unit 2010 is configured to determine a first position, which is used for the UE transmitting HARQ feedback when the UE does not request the BS to retransmit the initial transmission of the downlink data.

The receiving unit 2020 is configured to receive from the BS an indication indicating a second position, which is used for the UE transmitting HARQ feedback of the downlink data when the UE requests the BS to retransmit the initial transmission of the downlink data. The second position is different from the first position.

The transmitting unit 2030 is configured to transmit HARQ feedback of the downlink data to the BS using the second position to indicate that the UE requests retransmission of the initial transmission of the downlink data.

Optionally, e.g., when the HARQ feedback is transmitted on PUCCH, the first position is indicated by a first Walsh code, which is determined based on a CCE index allocated to the UE. In this case, the second position is indicated by a second Walsh code, which is determined from one or more available Walsh codes other than the first Walsh code within the same PRB as that of the first Walsh code.

Optionally, e.g., when the HARQ feedback is transmitted on PUSCH, the first position is indicated by first two scrambling sequences, which are determined based on a total number of downlink transmissions within a bundling window. In this case, the second position is indicated by a third scrambling sequence, which is determined from available scrambling sequences other than the first two scrambling sequences.

Although the present technology has been described above with reference to specific embodiments, it is not intended to be limited to the specific form set forth herein. For example, the embodiments presented herein are not limited to the existing LTE system; rather they are equally applicable to new communication standards defined in future. The technology is limited only by the accompanying claims and other embodiments than the specific above are equally possible within the scope of the appended claims. As used herein, the terms "comprise/comprises" or "include/ includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

What is claimed is:

1. A method used in a Base Station, BS, for transmitting control information to a User Equipment, UE, the method comprising:
  generating the control information for a transmission of data, which are downlink data transmitted from the BS to the UE or uplink data transmitted from the UE to the BS, such that:
    the control information comprises a first indication that indicates whether the transmission is an initial transmission of the data or a retransmission of the data;
    if the transmission is the initial transmission of the data, the control information has a first layout that is different than a second layout used if the transmission is a retransmission of the data and the control information further comprises a second indication for determining a modulation mode and a Transport Block, TB, size of the data; and
    if the transmission is a retransmission of the data, the control information has the second layout that is different than the first layout and further comprises a third indication that indicates a modulation mode and a redundancy version for the retransmission of the data;
  wherein, if the data is downlink data and the downlink data is in the retransmission:
    determining a first Walsh code for the UE transmitting Hybrid Automatic Repeat Request, HARQ, feedback based on a Control Channel Element, CCE, index allocated to the UE;
    determining a second Walsh code, which is used for the UE transmitting the HARQ feedback of the downlink data when the UE requests the BS to retransmit the initial transmission of the downlink data, from one or more available Walsh codes other than the first Walsh code within a same Physical Resource Block, PRB, as that of the first Walsh code;
    generating a fourth indication indicating the second Walsh code, the fourth indication being comprised in the control information;
    receiving the HARQ feedback of the downlink data from the UE; and
    receiving the HARQ feedback of the downlink data from the UE; and
  transmitting the control information to the UE.

2. The method of claim 1, wherein the second indication consists of 3 bits that represent $2^3$ values where all of the $2^3$ values are for determining the TB size of the data.

3. The method of claim 1, wherein the second indication consists of 5 bits that represent $2^5=32$ values where all of the 32 values are for determining the TB size of the data.

4. A method used in a Base Station, BS, for transmitting control information to a User Equipment, UE, the method comprising:
  generating the control information for a transmission of data, which are downlink data transmitted from the BS to the UE or uplink data transmitted from the UE to the BS, such that:
    the control information comprises a first indication that indicates whether the transmission is an initial transmission of the data or a retransmission of the data;
    if the transmission is the initial transmission of the data, the control information has a first layout that is different than a second layout used if the transmission is a retransmission of the data and the control information further comprises a second indication for determining a modulation mode and a Transport Block, TB, size of the data; and
    if the transmission is a retransmission of the data, the control information has the second layout that is different than the first layout and further comprises a third indication that indicates a modulation mode and a redundancy version for the retransmission of the data;
  wherein if the data are uplink data and if the uplink data are in the retransmission, the method further comprises:
    determining first two scrambling sequences for the UE masking Hybrid Automatic Repeat Request, HARQ, feedback of previous downlink data within a bundling window based on a total number of downlink transmissions within the bundling window;
    determining a third scrambling sequence, which is used for the UE masking the HARQ feedback of the previous downlink data when the UE requests the BS to retransmit an initial transmission of the previous downlink data, from available scrambling sequences other than the first two scrambling sequences;
    generating a fifth indication indicating the third scrambling sequence, the fifth indication being comprised in the control information;
    receiving the HARQ feedback from the UE; and
    identifying that the UE requests retransmission of the initial transmission of the previous downlink data if the HARQ feedback is masked with the third scrambling sequence; and
  transmitting the control information to the UE.

5. A method used in a Base Station, BS, for transmitting control information to a User Equipment, UE, the method comprising:
  generating the control information for a transmission of data, which are downlink data transmitted from the BS to the UE or uplink data transmitted from the UE to the BS, such that:
    the control information comprises a first indication that indicates whether the transmission is an initial transmission of the data or a retransmission of the data;
    if the transmission is the initial transmission of the data, the control information has a first layout that is different than a second layout used if the transmission is a retransmission of the data and the control information further comprises a second indication for determining a modulation mode and a Transport Block, TB, size of the data; and
    if the transmission is a retransmission of the data, the control information has the second layout that is different than the first layout and further comprises a third indication that indicates a modulation mode and a redundancy version for the retransmission of the data;
    wherein the control information is transmitted via Downlink Control Information, DCI,
      wherein if the data are in the initial transmission, the first indication is of one bit, and the second indication is of five bits; and wherein if the data are in the retransmission, the first indication is of one bit, and the third indication is of three bits and transmitting the control information to the UE.

6. A method used in a User Equipment, UE, for handling control information from a Base Station, BS, the method comprising:

receiving the control information for a transmission of data, which are downlink data transmitted from the BS to the UE or uplink data transmitted from the UE to the BS, such that:

the control information comprises a first indication that indicates whether the transmission is an initial transmission of the data or a retransmission of the data;

if the transmission is the initial transmission of the data, the control information has a first layout that is different than a second layout used if the transmission is a retransmission of the data and the control information further comprises a second indication for determining a modulation mode and a Transport Block, TB, size of the data; and if the transmission is a retransmission of the data, the control information has the second layout that is different than the first layout and further comprises a third indication that indicates a modulation mode and a redundancy version for the retransmission of the data;

wherein if the data is downlink data and the downlink data is in the retransmission:

determining a first Walsh code for transmitting Hybrid Automatic Repeat Request, HARQ, feedback based on a Control Channel Element, CCE, index allocated to the UE;

determining a second Walsh code, which is used for the UE transmitting the HARQ feedback of the downlink data when the UE requests the BS to retransmit the initial transmission of the downlink data, based on a fourth indication comprised in the control information, the second Walsh code being selected from one or more available Walsh codes other than the first Walsh code within a same Physical Resource Block, PRB, as that of the first Walsh code; and transmitting the HARQ feedback of the downlink data to the BS using the second Walsh code to indicate that the UE requests retransmission of the initial transmission of the downlink data.

7. The method of claim 6, wherein the second indication consists of 3 bits that represent $2^3$ values where all of the $2^3$ values are for determining the TB size of the data.

8. The method of claim 6, wherein the second indication consists of 5 bits that represent $2^5=32$ values where all of the 32 values are for determining the TB size of the data.

9. A method used in a User Equipment, UE, for handling control information from a Base Station, BS, the method comprising:

receiving the control information for a transmission of data, which are downlink data transmitted from the BS to the UE or uplink data transmitted from the UE to the BS, such that:

the control information comprises a first indication that indicates whether the transmission is an initial transmission of the data or a retransmission of the data;

if the transmission is the initial transmission of the data, the control information has a first layout that is different than a second layout used if the transmission is a retransmission of the data and the control information further comprises a second indication for determining a modulation mode and a Transport Block, TB, size of the data; and if the transmission is a retransmission of the data, the control information has the second layout that is different than the first layout and further comprises a third indication that indicates a modulation mode and a redundancy version for the retransmission of the data;

wherein if the data are uplink data and if the uplink data are in the retransmission, the method further comprises:

determining first two scrambling sequences for the UE masking Hybrid Automatic Repeat Request, HARQ, feedback of previous downlink data within a bundling window based on a total number of downlink transmissions within the bundling window;

determining a third scrambling sequence, which is used for the UE masking the HARQ feedback of the previous downlink data when the UE requests the BS to retransmit an initial transmission of the previous downlink data, based on a fifth indication comprised in the control information, the third scrambling sequence being selected from available scrambling sequences other than the first two scrambling sequences; and transmitting the HARQ feedback to the BS to indicate that the UE requests retransmission of the initial transmission of the previous downlink data if the HARQ feedback is masked with the third scrambling sequence.

10. A method used in a User Equipment, UE, for handling control information from a Base Station, BS, the method comprising:

receiving the control information for a transmission of data, which are downlink data transmitted from the BS to the UE or uplink data transmitted from the UE to the BS, such that:

the control information comprises a first indication that indicates whether the transmission is an initial transmission of the data or a retransmission of the data;

if the transmission is the initial transmission of the data, the control information has a first layout that is different than a second layout used if the transmission is a retransmission of the data and the control information further comprises a second indication for determining a modulation mode and a Transport Block, TB, size of the data; and if the transmission is a retransmission of the data, the control information has the second layout that is different than the first layout and further comprises a third indication that indicates a modulation mode and a redundancy version for the retransmission of the data;

wherein the control information is received via Downlink Control Information, DCI, and if the data are in the initial transmission, the first indication is of one bit, and the second indication is of five bits; and wherein the control information is received via the Downlink Control Information, DCI, and if the data are in the retransmission, the first indication is of one bit, and the third indication is of three bits.

11. A method used in a Base Station, BS, for identifying that a User Equipment, UE, requests the BS to retransmit an initial transmission of downlink data, comprising:

determining a first position, which is used for the UE transmitting Hybrid Automatic Repeat Request, HARQ, feedback when the UE does not request the BS to retransmit the initial transmission of the downlink data;

determining a second position, which is used for the UE transmitting the HARQ feedback of the downlink data when the UE requests the BS to retransmit the initial transmission of the downlink data, the second position being different from the first position;

transmitting to the UE an indication indicating the second position;

receiving the HARQ feedback of the downlink data from the UE; and identifying that the UE requests retransmission of the initial transmission of the downlink data if the HARQ feedback uses the second position.

12. The method according to claim 11, wherein
the first position is indicated by a first Walsh code, which is determined based on a Control Channel Element, CCE, index allocated to the UE, and
the second position is indicated by a second Walsh code, which is determined from one or more available Walsh codes other than the first Walsh code within a same Physical Resource Block, PRB, as that of the first Walsh code.

13. The method according to claim 11, wherein
the first position is indicated by first two scrambling sequences, which are determined based on a total number of downlink transmissions within a bundling window, and
the second position is indicated by a third scrambling sequence, which is determined from available scrambling sequences other than the first two scrambling sequences.

14. A method used in User Equipment, UE, for requesting a Base Station, BS, to retransmit an initial transmission of downlink data, comprising:
determining a first position, which is used for the UE transmitting Hybrid Automatic Repeat Request, HARQ, feedback when the UE does not request the BS to retransmit the initial transmission of the downlink data;
receiving from the BS an indication indicating a second position, which is used for the UE transmitting the HARQ feedback of the downlink data when the UE requests the BS to retransmit the initial transmission of the downlink data, the second position being different from the first position; and
transmitting the HARQ feedback of the downlink data to the BS using the second position to indicate that the UE requests retransmission of the initial transmission of the downlink data.

15. The method according to claim 14,
wherein the first position is indicated by a first Walsh code, which is determined based on a Control Channel Element, CCE, index allocated to the UE, and
wherein the second position is indicated by a second Walsh code, which is determined from one or more available Walsh codes other than the first Walsh code within a same Physical Resource Block, PRB, as that of the first Walsh code.

16. The method according to claim 14,
wherein the first position is indicated by first two scrambling sequences, which are determined based on a total number of downlink transmissions within a bundling window, and
wherein the second position is indicated by a third scrambling sequence, which is determined from available scrambling sequences other than the first two scrambling sequences.

17. A Base Station, BS, for transmitting control information to a User Equipment, UE, the BS comprising a generating unit a transmitting unit, a determining unit, a receiving unit, and a identifying unit, wherein:
the generating unit is configured to generate the control information for a transmission of data, which are downlink data transmitted from the BS to the UE or uplink data transmitted from the UE to the BS, such that:
the control information comprises a first indication that indicates whether the transmission is an initial transmission of the data or a retransmission of the data;
if the transmission is the initial transmission of the data, the control information has a first layout that is different than a second layout used if the transmission is a retransmission of the data and the control information further comprises a second indication for determining a modulation mode and a Transport Block, TB, size of the data; and
if the transmission is a retransmission of the data, the control information has the second layout that is different than the first layout and further comprises a third indication that indicates a modulation mode and a redundancy version for the retransmission of the data;
wherein if the data are downlink data and the downlink data are in the retransmission:
the determining unit is configured to determine a first Walsh code for the UE transmitting Hybrid Automatic Repeat Request, HARQ, feedback based on a Control Channel Element, CCE, index allocated to the UE;
the determining unit is further configured to determine a second Walsh code, which is used for the UE transmitting the HARQ feedback of the downlink data when the UE requests the BS to retransmit the initial transmission of the downlink data, from one or more available Walsh codes other than the first Walsh code within a same Physical Resource Block, PRB, as that of the first Walsh code;
the generating unit is further configured to generate a fourth indication indicating the second Walsh code, the fourth indication being comprised in the control information;
the receiving unit is configured to receive the HARQ feedback of the downlink data from the UE; and
the identifying unit is configured to identify that the UE requests retransmission of the initial transmission of the downlink data if the HARQ feedback uses the second Walsh code; and
the transmitting unit is configured to transmit the control information to the UE.

18. The method of claim 17, wherein the second indication consists of 3 bits that represent $2^3$ values where all of the $2^3$ values are for determining the TB size of the data.

19. The method of claim 17, wherein the second indication consists of 5 bits that represent $2^5=32$ values where all of the 32 values are for determining the TB size of the data.

20. A Base Station, BS, for transmitting control information to a User Equipment, UE, the BS comprising a generating unit, a transmitting unit, a determining unit, a receiving unit, and a identifying unit, wherein:
the generating unit is configured to generate the control information for a transmission of data, which are downlink data transmitted from the BS to the UE or uplink data transmitted from the UE to the BS, such that:
  the control information comprises a first indication that indicates whether the transmission is an initial transmission of the data or a retransmission of the data;
  if the transmission is the initial transmission of the data, the control information has a first layout that is different than a second layout used if the transmission is a retransmission of the data and the control information further comprises a second indication for determining a modulation mode and a Transport Block, TB, size of the data; and
  if the transmission is a retransmission of the data, the control information has the second layout that is different than the first layout and further comprises a third indication that indicates a modulation mode and a redundancy version for the retransmission of the data;
wherein if the data are uplink data, and the uplink data are in the retransmission:
  the determining unit is configured to determine first two scrambling sequences for the UE masking Hybrid Automatic Repeat Request, HARQ, feedback of previous downlink data within a bundling window based on a total number of downlink transmissions within the bundling window;
  the determining unit is further configured to determine a third scrambling sequence, which is used for the UE masking the HARQ feedback of the previous downlink data when the UE requests the BS to retransmit an initial transmission of the previous downlink data, from available scrambling sequences other than the first two scrambling sequences;
  the generating unit is further configured to generate a fifth indication indicating the third scrambling sequence, the fifth indication being comprised in the control information;
  the receiving unit is configured to receive the HARQ feedback of the previous downlink data from the UE; and
  the identifying unit is configured to identify that the UE requests retransmission of the initial transmission of the previous downlink data if the HARQ feedback is masked with the third scrambling sequence; and
the transmitting unit is configured to transmit the control information to the UE.

21. A Base Station, BS, for transmitting control information to a User Equipment, UE, the BS comprising a generating unit, and a transmitting unit, wherein:
  the generating unit is configured to generate the control information for a transmission of data, which are downlink data transmitted from the BS to the UE or uplink data transmitted from the UE to the BS, such that:
    the control information comprises a first indication that indicates whether the transmission is an initial transmission of the data or a retransmission of the data;
    if the transmission is the initial transmission of the data, the control information has a first layout that is different than a second layout used if the transmission is a retransmission of the data and the control information further comprises a second indication for determining a modulation mode and a Transport Block, TB, size of the data; and
    if the transmission is a retransmission of the data, the control information has the second layout that is different than the first layout and further comprises a third indication that indicates a modulation mode and a redundancy version for the retransmission of the data;
  wherein the transmitting unit is further configured to transmit the control information via Downlink Control Information, DCI, and if the data are in the initial transmission, the first indication is of one bit, and the second indication is of five bits; and
  wherein the transmitting unit is further configured to transmit the control information via DCI and if the data are in the retransmission, the first indication is of one bit, and the third indication is of three bits; and
  the transmitting unit is configured to transmit the control information to the UE.

22. A User Equipment, UE, for handling control information from a Base Station, BS, the UE comprising a receiving unit, a transmitting unit, and a determining unit, wherein:
  the receiving unit is configured to receive the control information for a transmission of data, which are downlink data transmitted from the BS to the UE or uplink data transmitted from the UE to the BS, such that:
    the control information comprises a first indication that indicates whether the transmission is an initial transmission of the data or a retransmission of the data; and
  the determining unit is configured to determine if the transmission is the initial transmission of the data;
    if the transmission is an initial transmission of the data, the control information has a first layout that is different than a second layout used if the transmission is a retransmission of the data and the control information further comprises a second indication for determining a modulation mode and a Transport Block, TB, size of the data; and
    if the transmission is a retransmission of the data, the control information has the second layout that is different than the first layout and further comprises a third indication that indicates a modulation mode and redundancy version for the retransmission of the data;
wherein if the data are downlink data and the downlink data is in the retransmission:
  the determining unit is further configured to determine a first Walsh code for transmitting Hybrid Automatic Repeat Request, HARQ, feedback based on a Control Channel Element, CCE, index allocated to the UE;
  the determining unit is further configured to determine a second Walsh code, which is used for the UE transmitting the HARQ feedback of the downlink data when the UE requests the BS to retransmit the initial transmission of the downlink data, based on a fourth indication comprised in the control information, the second Walsh code being selected from one or more available Walsh codes other than the first Walsh code within a same Physical Resource Block, PRB, as that of the first Walsh code; and
  the transmitting unit is configured to transmit the HARQ feedback of the downlink data to the BS using the second Walsh code to indicate that the UE requests retransmission of the initial transmission of the downlink data.

23. The method of claim 22, wherein the second indication consists of 3 bits that represent $2^3$ values where all of the $2^3$ values are for determining the TB size of the data.

24. The method of claim 22, wherein the second indication consists of 5 bits that represent $2^5=32$ values where all of the 32 values are for determining the TB size of the data.

25. A User Equipment, UE, for handling control information from a Base Station, BS, the UE comprising a receiving unit, a transmitting unit, and a determining unit, wherein:
- the receiving unit is configured to receive the control information for a transmission of data, which are downlink data transmitted from the BS to the UE or uplink data transmitted from the UE to the BS, such that:
  - the control information comprises a first indication that indicates whether the transmission is an initial transmission of the data or a retransmission of the data; and
  - the determining unit is configured to determine if the transmission is the initial transmission of the data;
  - if the transmission is an initial transmission of the data, the control information has a first layout that is different than a second layout used if the transmission is a retransmission of the data and the control information further comprises a second indication for determining a modulation mode and a Transport Block, TB, size of the data; and
  - if the transmission is a retransmission of the data, the control information has the second layout that is different than the first layout and further comprises a third indication that indicates a modulation mode and redundancy version for the retransmission of the data;
- wherein if the data are uplink data and the uplink data is in the retransmission:
  - the determining unit is further configured to determine first two scrambling sequences for the UE masking Hybrid Automatic Repeat Request, HARQ, feedback of previous downlink data within a bundling window based on a total number of downlink transmissions within the bundling window;
  - the determining unit is further configured to determine a third scrambling sequence, which is used for the UE masking the HARQ feedback of the previous downlink data when the UE requests the BS to retransmit an initial transmission of the previous downlink data, based on a fifth indication comprised in the control information, the third scrambling sequence being selected from available scrambling sequences other than the first two scrambling sequences; and
  - the transmitting unit is configured to transmit the HARQ feedback to the BS to indicate that the UE requests retransmission of the initial transmission of the previous downlink data if the HARQ feedback is masked with the third scrambling sequence.

26. A User Equipment, UE, for handling control information from a Base Station, BS, the UE comprising a receiving unit and a determining unit, wherein:
- the receiving unit is configured to receive the control information for a transmission of data, which are downlink data transmitted from the BS to the UE or uplink data transmitted from the UE to the BS, such that:
  - the control information comprises a first indication that indicates whether the transmission is an initial transmission of the data or a retransmission of the data; and
  - the determining unit is configured to determine if the transmission is the initial transmission of the data;
  - if the transmission is the initial transmission of the data, the control information has a first layout that is different than a second layout used if the transmission is a retransmission of the data and the control information further comprises a second indication for determining a modulation mode and a Transport Block, TB, size of the data; and
  - if the transmission is a retransmission of the data, the control information has the second layout that is different than the first layout and further comprises a third indication that indicates a modulation mode and redundancy version for the retransmission of the data;
- wherein the receiving unit is further configured to receive the control information via Downlink Control Information, DCI, and, if the data are in the initial transmission, the first indication is of one bit, and the second indication is of five bits; and
- wherein the receiving unit is further configured to receive the control information via DCI, and, if the data are in the retransmission, the first indication is of one bit, and the third indication is of three bits.

* * * * *